USO12322782B1

United States Patent
Du et al.

(10) Patent No.: US 12,322,782 B1
(45) Date of Patent: Jun. 3, 2025

(54) SOLVENT-FREE PROCESSING METHODS FOR MANUFACTURING SOLID-STATE BATTERIES

(71) Applicant: Ampcera Inc., Milpitas, CA (US)

(72) Inventors: Hui Du, Tucson, AZ (US); James Emery Brown, Tucson, AZ (US); Chen Chen, Tucson, AZ (US); Sumin Zhu, San Franscisco, CA (US)

(73) Assignee: Ampcera Inc., Tucson, AZ (US)

(*) Notice: Subject to any disclaimer, the term of this patent is extended or adjusted under 35 U.S.C. 154(b) by 0 days.

(21) Appl. No.: 17/552,730

(22) Filed: Dec. 16, 2021

Related U.S. Application Data

(60) Provisional application No. 63/126,303, filed on Dec. 16, 2020.

(51) Int. Cl.
*H01M 4/04* (2006.01)
*H01M 10/0562* (2010.01)
*H01M 4/02* (2006.01)
*H01M 4/66* (2006.01)

(52) U.S. Cl.
CPC ..... *H01M 4/0419* (2013.01); *H01M 10/0562* (2013.01); *H01M 2004/028* (2013.01); *H01M 4/662* (2013.01); *H01M 2300/0077* (2013.01)

(58) Field of Classification Search
CPC ......... H01M 10/0562; H01M 10/0585; H01M 4/0419; H01M 2004/028; H01M 4/366; H01M 4/362; C23C 24/04; C23C 24/045; Y02P 70/50
See application file for complete search history.

(56) References Cited

U.S. PATENT DOCUMENTS

| 7,083,877 B2 | 8/2006 | Iwamoto et al. |
| 8,455,137 B2 | 6/2013 | Benson |
| 9,472,808 B2 | 10/2016 | Engel et al. |
| 9,972,838 B2 | 2/2018 | Teran et al. |
| 10,020,540 B2 | 7/2018 | Shakespeare |
| 10,047,451 B2 | 8/2018 | Gaben et al. |
| 10,347,937 B2 | 7/2019 | Beck et al. |
| 10,374,254 B2 | 8/2019 | Van Berkel |
| 10,700,377 B2 | 6/2020 | Thomas-Alyea et al. |
| 10,770,769 B2 | 9/2020 | Naga et al. |
| 10,811,688 B2 | 10/2020 | Zimmerman |
| 2004/0258984 A1 | 12/2004 | Ariel et al. |

(Continued)

FOREIGN PATENT DOCUMENTS

| JP | 4363491 | * 11/2011 |
| JP | 2015-153663 | * 8/2015 |

(Continued)

OTHER PUBLICATIONS

D. Tejero-Martin, Beyond Traditional Coatings: A Review on Thermal-Sprayed Functional and Smart Coatings, Journal of Thermal Spray Technology vol. 28, pp. 598-644, 2019.

(Continued)

*Primary Examiner* — Tabassom Tadayyon Eslami
(74) *Attorney, Agent, or Firm* — Walters & Wasylyna LLC

(57) ABSTRACT

A solvent-free processing method for manufacturing a solid-state battery that includes a first solid-state electrolyte layer and a first cathode layer. The method includes forming at least one of the first solid-state electrolyte layer and the first cathode layer by solvent-free energy-assisted spraying.

23 Claims, 18 Drawing Sheets

(56) References Cited

U.S. PATENT DOCUMENTS

| | | |
|---|---|---|
| 2007/0012244 A1* | 1/2007 | Klaassen .............. B32B 15/08 |
| | | 29/623.5 |
| 2009/0065042 A1 | 3/2009 | Reynolds |
| 2009/0239041 A1 | 9/2009 | Yura et al. |
| 2010/0323118 A1 | 12/2010 | Mohanty et al. |
| 2013/0337309 A1 | 12/2013 | Virkar |
| 2014/0287324 A1* | 9/2014 | Tsuchida ............ H01M 10/052 |
| | | 429/304 |
| 2015/0030909 A1 | 1/2015 | Ihlefeld et al. |
| 2015/0118572 A1 | 4/2015 | Lund et al. |
| 2016/0240896 A1 | 8/2016 | Zhang |
| 2016/0351973 A1 | 12/2016 | Albano et al. |
| 2017/0279155 A1 | 9/2017 | Sun |
| 2017/0301958 A1 | 10/2017 | Deng et al. |
| 2018/0138494 A1* | 5/2018 | Birt ...................... H01M 4/382 |
| 2018/0166741 A1 | 6/2018 | Xu |
| 2018/0261877 A1 | 9/2018 | Strand et al. |
| 2018/0277826 A1 | 9/2018 | Gayden |
| 2018/0301751 A1 | 10/2018 | Sakamoto et al. |
| 2019/0177238 A1 | 6/2019 | Yi et al. |
| 2019/0214672 A1 | 7/2019 | Chang et al. |
| 2019/0280330 A1 | 9/2019 | Albano |
| 2020/0176810 A1 | 6/2020 | Ogata |
| 2020/0365903 A1 | 11/2020 | Ogata |

FOREIGN PATENT DOCUMENTS

| | | | |
|---|---|---|---|
| KR | 2020-0052707 | * | 5/2020 |
| KR | 10-2020-0134688 | * | 12/2020 |
| WO | 2011/066518 | * | 6/2011 |
| WO | 2018093998 | | 5/2018 |

OTHER PUBLICATIONS

Fuming Du, All solid state lithium batteries based on lamellar garnet-type ceramic electrolytes, Journal of Power Sources, 300, 24-28, 2015.

Eongyu Yi, Flame made nanoparticles permit processing of dense, flexible, Li+ conducting ceramic electrolyte thin films of cubic-$Li_7La_3Zr_2O_{12}$ (c-LLZO) (1), Journal of Materials Chemistry A, 2016,4, 12947-12954.

* cited by examiner

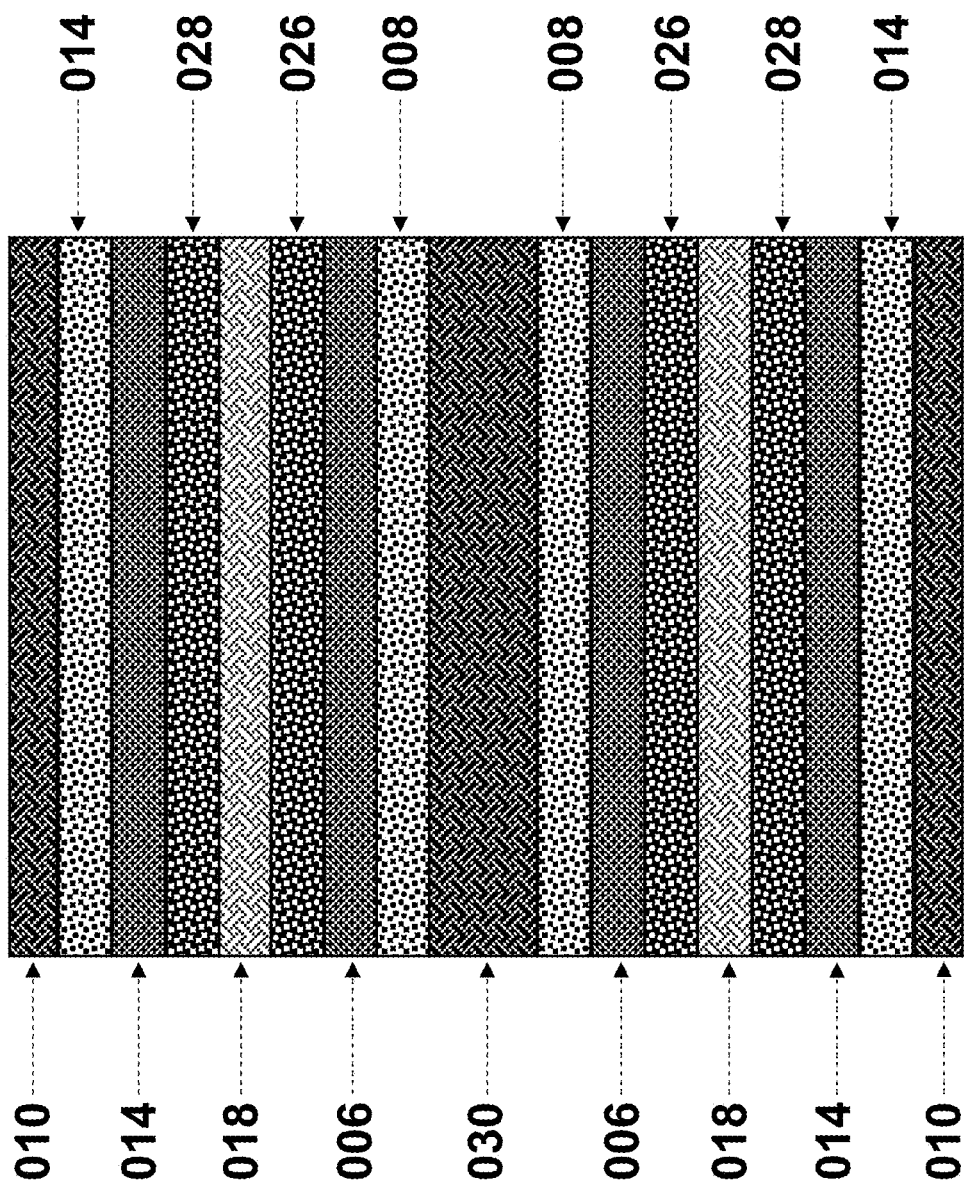

SOLVENT-FREE PROCESSING METHODS FOR MANUFACTURING SOLID-STATE BATTERIES

PRIORITY

The present invention claims the priority of U.S. Provisional Patent Application No. 63/126,303, filed Dec. 16, 2020, which is incorporated herein by reference in its entirety.

FIELD

The present application relates to the field of processing methods for manufacturing solid-state batteries.

BACKGROUND

Conventionally, solvent-based processing methods that employ binding polymer are used for manufacturing solid-state batteries. The resulting solid-state batteries can suffer from high impedance and the solvent-based processing methods may not be capable of high-throughput.

Accordingly, those skilled in the art continue with research and development in the field of processing methods for manufacturing solid-state batteries.

SUMMARY

In one embodiment, a solvent-free processing method for manufacturing a solid-state battery that includes a first solid-state electrolyte layer and a first cathode layer. The method includes forming at least one of the first solid-state electrolyte layer and the first cathode layer by solvent-free energy-assisted spraying.

In another embodiment, a binder-free processing method for manufacturing a solid-state battery that includes a first solid-state electrolyte layer and a first cathode layer. The method includes forming at least one of the first solid-state electrolyte layer and the first cathode layer by binder-free energy-assisted spraying.

In yet another embodiment, there is a solid-state battery formed by the above method.

Other embodiments of the disclosed methods and solid-state batteries will become apparent from the following detailed description, the accompanying drawings and the appended claims.

BRIEF DESCRIPTION OF THE DRAWINGS

FIG. 5D: A schematic illustration of a multi-layer solid-state battery.

DETAILED DESCRIPTION

Figure 1A:
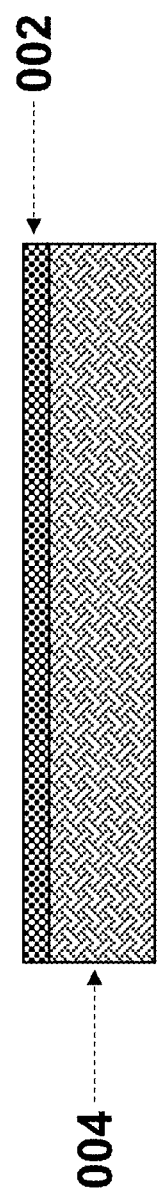
FIG. 1A: A schematic illustration of a lithium metal or lithium metal alloy film prelaminated onto a negative current collector.

This invention relates to a solvent-free processing method for solid-state batteries. The processing method may be a solvent-free energy-assisted spray process. In an aspect, the energy-assisted spray process may be a cold spray method. In an aspect, the energy-assisted spray process may be a thermal spray method. The solvent-free processing method may optionally include the use of a binding polymer.

This invention also relates to a solvent-free processing method for binder-free solid-state batteries. The processing method may be a solvent-free energy-assisted spray process. In an aspect, the energy-assisted spray process may be a cold spray method. In another aspect, the energy-assisted spray process may be a thermal spray method. The solvent-free processing method for binder-free solid-state batteries does not include the use of a binding polymer.

Conventional solid-state batteries suffer from high impedance and a lack of high-throughput processing methods. The high impedance originates from: 1) the use of solvents and binders in the solid-state battery and 2) poor contact between the elements of the solid-state batteries, e.g., particularly between the solid-state electrolyte and electrodes at the interfaces.

Conventionally, solvent-based processing methods that employ binding polymers can, or are typically, used to, for example, bind a cathode (conventional batteries) or composite cathode (solid-state batteries) to a positive current collector, or bind an anode (conventional batteries) or composite anode (solid-state batteries) to a negative current collector.

Additionally, solvent-based processing methods include binding polymers that can, or are typically, used to, bind the ionically conducting solid-state electrolyte particles together in a ceramic-polymer composite solid-state electrolyte membrane. This is becoming a common technique in the solid-state battery field for high-throughput production of solid-state electrolytes, and consequently solid-state batteries.

The invention of the present description relates to an solvent-free processing method for solid-state batteries and structural designs of solid-state batteries.

In an embodiment, a solvent-free processing method may be an energy-assisted spray processing method used to fabricate a solid-state battery.

In an aspect of the embodiment, an energy-assisted spray process may be a cold spray method in which energy assistance is relied upon in the form of kinetic energy to form a dense layer. The cold spray method may include supersonic particle deposition, in which a high-pressure carrier gas is used to accelerate materials at supersonic speeds toward a current collector or solid-state battery layers, or more preferably binder-free solid-state battery layers, enabling dense uniform layers to be achieved, wherein the high-pressure gas provides an energy assistance in the form of kinetic energy. Alternatively, the cold spray method may be performed at subsonic speeds, in which a lower-pressure carrier gas is used to accelerate materials at subsonic speeds. The cold spray method may be performed without preheating the materials to be deposited or the cold spray method may be performed with preheating the materials to be deposited. The cold spray method is performed at a low temperature below a melting point of one or more of the materials to be deposited.

In another aspect of the embodiment, an energy-assisted spray process may be thermal spray method in which energy assistance is relied upon in the form of thermal energy to form a dense layer. In thermal spray, a high temperature source, e.g., flame or plasma, is used to soften or deform the materials to be deposited enabling dense solid-state battery layers, or more preferably dense binder-free solid-state battery layers, upon impact, wherein the flame (or plasma) provides an energy assistance in the form of thermal energy. The thermal spray method includes, for example, plasma spray, flame spray, wire arc spray, etc.

In another embodiment, a solid-state battery may contain a current collector as the basis or foundation for the solid-state battery.

In an aspect of the embodiment, a solid-state battery may further contain a first solid-state electrolyte layer, a first composite cathode layer, a first composite anode layer, a first positive or negative current collector layer, wherein the layers are formed in a specific order onto the current collector, wherein all layers are formed using an energy-assisted spray process.

In another aspect of the embodiment, a multi-layered solid-state battery may further contain a first and second solid-state electrolyte layer, a first and second composite cathode layer, a first and second composite anode layer, a first positive or negative current collector layer, wherein the layers are formed onto the current collector in a specific order, wherein all layers are formed using an energy-assisted spray process.

In yet another embodiment, a current collector may be a negative current collector with a lithium metal, or a lithium metal alloy, film prelaminated onto one surface, or both surfaces in the case of a multi-layered structure, as a foundation for a solid-state lithium metal battery.

In an aspect of the embodiment, a first solid-state electrolyte layer may be formed onto the one, or both, lithium metal, or lithium metal alloy, film layers.

In another aspect of the embodiment, a first composite cathode layer may be formed onto the one, or both, first solid-state electrolyte layers.

In yet another aspect of the embodiment, a first positive current collector layer may be formed onto the one, or both, first composite cathode layers.

In yet another aspect of the embodiment, a multi-layered solid-state lithium metal battery may be further formed by applying a second composite cathode layer onto the one, or both, first positive current collectors followed by a second solid-state electrolyte layer. A lithium metal, or lithium metal alloy, prelaminated onto a negative current collector may be laminated onto the one, or both, second solid-state electrolyte layers.

In yet another embodiment, a current collector may be a negative current collector with a first solid-state electrolyte layer formed onto one surface, or both surfaces in the case of a multi-layered structure, as a foundation for an anodeless solid-state battery.

In an aspect of the embodiment, a first composite cathode layer may be formed onto the one, or both, first solid-state electrolyte layers.

In another aspect of the embodiment, a first positive current collector layer may be formed onto the one, or both, the first composite cathode layers.

In yet another aspect of the embodiment, a multi-layered anodeless solid-state battery may be further formed by applying a second composite cathode layer onto the one, or both, first positive current collector layers, followed by a second solid-state electrolyte, followed by a first negative current collector layer.

In yet another embodiment, a current collector may be a negative current collector with a first composite anode layer formed onto one surface, or both surfaces in the case of a multi-layered structure, as a foundation for a solid-state battery.

In an aspect of the embodiment, a first solid-state electrolyte layer may be formed onto the one, or both, first composite anode layers.

In another aspect of the embodiment, a first composite cathode layer may be formed onto the one, or both, first solid-state electrolyte layers.

In yet another aspect of the embodiment, a first positive current collector layer may be formed onto the one, or both, first composite cathode layers.

In yet another aspect of the embodiment, a multi-layered solid-state battery may be further formed by forming a second composite cathode layer onto the one, or both, first positive current collector layers, followed by a second solid-state electrolyte layer, followed by a second composite anode layer, followed by a first negative current collector layer.

In yet another embodiment, a current collector may be a positive current collector with a first composite cathode layer formed one surface, or both surfaces in the case of a multi-layered structure, as a foundation for a solid-state battery.

In an aspect of the embodiment, a first solid-state electrolyte layer may be formed onto the one, or both, first composite cathode layers.

In another aspect of the embodiment, a first composite anode layer may be formed onto the one, or both, first solid-state electrolyte layers.

In yet another aspect of the embodiment, a first negative current collector layer may be formed onto the one, or both, first composite anode layers.

In yet another aspect of the embodiment, a multi-layered solid-state battery may be further formed by forming a second composite anode layer onto the one, or both, first negative current collector layers, followed by a second solid-state electrolyte layer, followed by a second composite cathode layer, followed by a first positive current collector layer.

In yet another aspect of the embodiment, each layer of the multi-layered solid-state battery may have a thickness of 5

µm or more, more preferably 10 µm or more, even more preferably 15 µm or more, even more preferably 20 µm or more, and even more preferably 25 µm or more.

The invention of the present description also relates to an energy-assisted solvent-free spray processing method for binder-free solid-state batteries and structural designs thereof.

The energy-assisted solvent-free spray processing methods of the present description can lower the impedance of solid-state batteries by eliminating the use of binders. The binder-free processing methods of the present description can also enable better ionic contact between the solid-state electrolyte and electrodes reducing interfacial impedance. Moreover, the binder-free processing methods of the present description can be scaled up enabling a high-throughput production method for solid-state batteries. Thus, the present description avoids the above-described problems caused by the conventional use of binders in the prior art.

In an embodiment, a solvent-free processing method may be an energy-assisted spray processing method used to fabricate a binder-free solid-state battery.

In an aspect of the embodiment, an energy-assisted spray process may be a cold spray method.

In another aspect of the embodiment, an energy-assisted spray process may be a thermal spray method, including, for example, plasma spray, flame spray, wire arc spray, etc.

In another embodiment, a binder-free solid-state battery may contain a current collector as the basis or foundation for the binder-free solid-state battery.

In an aspect of the embodiment, a binder-free solid-state battery may further contain a first binder-free solid-state electrolyte layer, a first binder-free composite cathode layer, a first binder-free composite anode layer, a first positive or negative current collector layer, wherein the layers are formed in a specific order onto the current collector, wherein all layers are formed using an energy-assisted spray process.

In another aspect of the embodiment, a multi-layered binder-free solid-state battery may further contain a first and second binder-free solid-state electrolyte layer, a first and second binder-free composite cathode layer, a first and second binder-free composite anode layer, a first positive or negative current collector layer, wherein the layers are formed onto the current collector in a specific order, wherein all layers are formed using an energy-assisted spray process.

In yet another embodiment, a current collector may be a negative current collector with a lithium metal, or a lithium metal alloy, film prelaminated onto one surface, or both surfaces in the case of a multi-layered structure, as a foundation for a binder-free solid-state lithium metal battery.

In an aspect of the embodiment, a first binder-free solid-state electrolyte layer may be formed onto the one, or both, lithium metal, or lithium metal alloy, film layers.

In another aspect of the embodiment, a first binder-free composite cathode layer may be formed onto the one, or both, first binder-free solid-state electrolyte layers.

In yet another aspect of the embodiment, a first positive current collector layer may be formed onto the one, or both, first binder-free composite cathode layers.

In yet another aspect of the embodiment, a multi-layered binder-free solid-state lithium metal battery may be further formed by applying a second binder-free composite cathode layer onto the one, or both, first positive current collectors followed by a second binder-free solid-state electrolyte layer. A lithium metal, or lithium metal alloy, prelaminated onto a negative current collector may be laminated onto the one, or both, second binder-free solid-state electrolyte layers.

In yet another embodiment, a current collector may be a negative current collector with a first binder-free solid-state electrolyte layer formed onto one surface, or both surfaces in the case of a multi-layered structure, as a foundation of an anodeless binder-free solid-state battery.

In an aspect of the embodiment, a first binder-free composite cathode layer may be formed onto the one, or both, first binder-free solid-state electrolyte layers.

In another aspect of the embodiment, a first positive current collector layer may be formed onto the one, or both, the first binder-free composite cathode layers.

In yet another aspect of the embodiment, a multi-layered anodeless binder-free solid-state battery may be further formed by applying a second binder-free composite cathode layer onto the one, or both, first positive current collector layers, followed by a second binder-free solid-state electrolyte, followed by a first negative current collector layer.

In yet another embodiment, a current collector may be a negative current collector with a first binder-free composite anode layer formed onto one surface, or both surfaces in the case of a multi-layered structure, as a foundation of a binder-free solid-state battery.

In an aspect of the embodiment, a first binder-free solid-state electrolyte layer may be formed onto the one, or both, first binder-free composite anode layers.

In another aspect of the embodiment, a first binder-free composite cathode layer may be formed onto the one, or both, first binder-free solid-state electrolyte layers.

In yet another aspect of the embodiment, a first positive current collector layer may be formed onto the one, or both, first binder-free composite cathode layers.

In yet another aspect of the embodiment, a multi-layered binder-free solid-state battery may be further formed by forming a second binder-free composite cathode layer onto the one, or both, first positive current collector layers, followed by a second binder-free solid-state electrolyte layer, followed by a second binder-free composite anode layer, followed by a first negative current collector layer.

In yet another embodiment, a current collector may be a positive current collector with a first binder-free composite cathode layer formed one surface, or both surfaces in the case of a multi-layered structure, as a foundation of a binder-free solid-state battery.

In an aspect of the embodiment, a first binder-free solid-state electrolyte layer may be formed onto the one, or both, first binder-free composite cathode layers.

In another aspect of the embodiment, a first binder-free composite anode layer may be formed onto the one, or both, first binder-free solid-state electrolyte layers.

In yet another aspect of the embodiment, a first negative current collector layer may be formed onto the one, or both, first binder-free composite anode layers.

In yet another aspect of the embodiment, a multi-layered binder-free solid-state battery may be further formed by forming a second binder-free composite anode layer onto the one, or both, first negative current collector layers, followed by a second binder-free solid-state electrolyte layer, followed by a second binder-free composite cathode layer, followed by a first positive current collector layer.

In yet another aspect of the embodiment, each layer of the multi-layered binder-free solid-state battery may have a thickness of 5 µm or more, more preferably 10 µm or more, even more preferably 15 µm or more, even more preferably 20 µm or more, and even more preferably 25 µm or more.

The present description relates to an energy-assisted spray processing method.

A spray processing method may be described as an energy-assisted processing method, in which dry ceramic particles and polymer mixtures, are sprayed to form solid-state battery layers.

A spray processing method may be described as an energy-assisted processing method, in which dry ceramic particles, or dry ceramic particle mixtures, are sprayed to form binder-free solid-state battery layers.

An energy-assisted spray processing method may be a cold spray method.

In supersonic particle deposition, a high-pressure carrier gas is used to accelerate materials at supersonic speeds toward a current collector or solid-state battery layers, or more preferably binder-free solid-state battery layers, enabling dense uniform layers to be achieved, wherein the high-pressure gas provides an energy assistance in the form of kinetic energy. In subsonic particle deposition, a lower pressure carrier gas is used to accelerate materials at subsonic speeds.

An energy-assisted spray processing method may be a thermal spray method.

Thermal spray methods may include, for example, plasma spray, flame spray, wire arc spray, high velocity oxy-fuel spray, etc.

In thermal spray, a high temperature source, e.g., flame or plasma, is used to soft or deform the materials enabling dense solid-state battery layers, or more preferably dense binder-free solid-state battery layers, upon impact, wherein the high temperature source provides an energy assistance in the form of thermal energy.

An energy-assisted spray processing method may be done in ambient conditions.

An energy-assisted spray processing method may be done under inert conditions.

An energy-assisted spray processing method may be done in a dry room.

An energy-assisted spray processing method may be done in a roll-to-roll process.

An energy-assisted spray processing method may be done manually or through an automated system.

An energy-assisted spraying processing method may be done in faster fashion to form solid-state, or more preferably binder-free solid-state, battery layers.

An energy-assisted spray processing method may be used to construct a first solid-state electrolyte layer, or more preferably a first binder-free solid-state electrolyte layer in a binder-free solid-state battery.

An energy-assisted spray processing method may be used to construct more than one solid-state electrolyte layers, or more preferably binder-free solid-state electrolyte layers in a multi-layer binder-free solid-state battery.

An energy-assisted spray processing method may be used to construct a first composite cathode layer, or more preferably a first binder-free composite cathode layer in a binder-free solid-state battery.

An energy-assisted spray processing method may be used to construct more than one composite cathode layers, or more preferably binder-free composite cathode layers in a multi-layer binder-free solid-state battery.

An energy-assisted spray processing method may be used to construct a first composite anode layer, or more preferably a first binder-free composite anode layer in a binder-free solid-state battery.

An energy-assisted spray processing method may be used to construct more than one composite anode layers, or more preferably binder-free composite anode layers in a multi-layer binder-free solid-state battery.

An energy-assisted spray processing method may be used to construct a first positive current collector layer in a solid-state battery, or more preferably a binder-free solid-state battery.

An energy-assisted spray processing method may be used to construct more than one positive current collector layers in a multi-layer solid-state battery, or more preferably a binder-free solid-state battery.

An energy-assisted spray processing method may be used to construct a first negative current collector layer in a solid-state battery, or more preferably a binder-free solid-state battery.

An energy-assisted spray processing method may be used to construct more than one negative current collector layers in a multi-layer solid-state battery, or more preferably a multi-layer binder-free solid-state battery.

The present description relates to a solid-state electrolyte layer, or more preferably a binder-free solid-state electrolyte layer.

A solid-state electrolyte layer, or more preferably a binder-free solid-state electrolyte layer may include or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

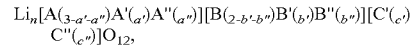

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv, wherein $0 \le a' < 2$ and $0 \le a'' < 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv, wherein $0 \le b'$, $0 \le b''$, and $b'+b'' \le 2$;

c. where C' and C" stand for a tetrahedral position of the crystal structure, i. where C' stands for one or more of Al, Ga, and boron, ii. where C" stands for one or more of Si and Ge, and iii, wherein $0 \le c' \le 0.5$ and $0 \le c'' \le 0.4$; and d. wherein $n = 7 + a' + 2 \cdot a'' - b' - 2 \cdot b'' - 3 \cdot c' - 4 \cdot c''$ and $4.5 \le n \le 7.5$.

In another example, a solid-state ionic conductive material includes perovskite-type oxides such as (Li,La)$TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_x Ti_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x^-$; wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

In yet another example, a solid-state ionic conductive material includes argyrodites materials the general formula: $Li_{18-2m-x}(M_2^{m+}Y_7^{2-})Y_{2-x}^{2-}X_x$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X=F^-$, $Cl^-$, $Br^-$, $I^-$, or a combination thereof; and x is in the range of $0 \leq x \leq 2$.

A solid-state electrolyte layer, or more preferably a binder-free solid-state electrolyte layer may have heatable particles embedded within, wherein the heatable particles are mixed into a feedstock prior to spraying, wherein the heatable particles may be coated with an electronically insulative layer, wherein the heatable particles are heated using, for example, induction heating or dielectric heating.

A solid-state electrolyte layer, or more preferably a binder-free solid-state electrolyte layer may be formed onto a composite cathode layer, or more preferably a binder-free composite cathode layer.

A solid-state electrolyte layer, or more preferably a binder-free solid-state electrolyte layer may be formed onto a composite anode layer, or more preferably a binder-free composite anode layer.

A solid-state electrolyte layer, or more preferably a binder-free solid-state electrolyte layer may be formed onto a prelaminated lithium metal, or lithium metal alloy, film.

A solid-state electrolyte layer, or more preferably a binder-free solid-state electrolyte layer may be formed onto a negative current collector.

A solid-state electrolyte layer, or more preferably a binder-free solid-state electrolyte layer may be formed onto a negative current collector layer.

A binder-free solid-state battery may contain one binder-free solid-state electrolyte layer.

A binder-free solid-state battery may have more than one binder-free solid-state electrolyte layer in a multi-layered solid-state battery.

A solid-state battery may contain one solid-state electrolyte layer.

A solid-state battery may have more than one solid-state electrolyte layer in a multi-layered solid-state battery.

A solid-state electrolyte layer may contain a binding polymer. An example of a binding polymer may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(e-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), -poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(e-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

A binding polymer may contain an ionic conducting salt. An example of an ionic conducting salt may include, for example, lithium bis(trifluoromethanesulfonyl)imide (LiTFSI) and lithium bis(fluorosulfonyl)imide (LiFSI), lithium bis(oxalato) borate (LiBOB), lithium Difluro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LIN(SO_2CF_3)_2$, $LiNO_3$, sodium bis(trifluoromethanesulfonyl)imide (NaTFSI) and sodium bis(fluorosulfonyl)imide (NaFSI), sodium bis(oxalato) borate (NaBOB) Sodium-difluoro (oxalato) borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, $NaNO_3$, magnesium bis(trifluoromethanesulfonyl)imide $(Mg(TFSI)_2)$ and magnesium bis(fluorosulfonyl)imide $(Mg(FSI)_2)$, magnesium bis(oxalato) borate $(Mg(BOB)_2)$, magnesium Difluro(oxalato)borate $(Mg(DFOB)_2)$, $Mg(SCN)_2$, $MgBr_2$, $MgI_2$, $Mg(ClO_4)_2$, $Mg(AsF_6)_2$, $Mg(SO_3CF_3)_2$, $Mg(SO_3CH_3)_2$, $Mg(BF_4)_2$, $Mg(PF_6)_2$, $Mg(NO_3)_2$, $Mg(CH_3COOH)_2$, potassium bis(trifluoromethanesulfonyl)imide (KTFSI) and potassium bis(fluorosulfonyl)imide (KFSI), potassium bis(oxalato) borate (KBOB), potassium Difluro(oxalato)borate (KDFOB), KSCN, KBr, KI, $KClO_4$, $KASF_6$, $KSO_3CF_3$, $KSO_3CH_3$, $KBF_4$, $KB(Ph)_4$, $KPF_6$, $KC(SO_2CF_3)_3$, $KN(SO_2CF_3)_2$, $KNO_3$, $Al(NO_3)_2$, $AlCl_3$, $Al_2(SO_4)_3$, $AlBr_3$, $AlI_3$, AlN, AlSCN, $Al(ClO_4)_3$.

The present description relates to a composite cathode layer, or more preferably a binder-free composite cathode layer.

A composite cathode layer, or more preferably a binder-free composite cathode layer may be composed of, for example, and active intercalation material, an electronic conducting material, and an ionic conducting material as the catholyte.

An active intercalation material in a composite cathode layer, or more preferably a binder-free composite cathode layer may include, for example, layered $YMO_2$, Y-rich layered $Y_{1+x}M_{1-x}O_2$, spinel $YM_2O_4$, olivine $YMPO_4$, silicate $Y_2MSiO_4$, borate $YMBO_3$, tavorite $YMPO_4F$ (where M is Fe, Co, Ni, Mn, Cu, Cr, etc.), (where Y is Li, Na, K, Mg, Zn, Al, etc.), vanadium oxides, sulfur, lithium sulfide, $FeF_3$, LiSe.

In the case of a lithium intercalation, active intercalation materials may include, for example, lithium iron phosphate ($LiFePO_4$), lithium cobalt oxide ($LiCoO_2$), lithium manganese oxide ($LiMn_2O_4$), and lithium nickel oxide ($LiNiO_2$), lithium nickel cobalt manganese oxide ($LiNi_xCo_yMn_zO_2$, $0.95 \geq x \geq 0.5, 0.3 \geq y \geq 0.025, 0.2 \pm z \geq 0.025$), lithium nickel cobalt aluminum oxide ($LiNi_xCo_yAl_zO_2$, $0.95 \geq x \geq 0.5$, $0.3 \geq y \geq 0.025, 0.2 \geq z \geq 0.025$), lithium nickel manganese spinel ($LiNi_{0.5}Mn_{1.5}O_4$), etc.

An active intercalation material may be coated with a protective layer to prevent reaction between the active cathode material and the catholyte or other components in the mixture, which includes, lithium borate, lithium aluminate ($LiAlO_2$), lithium tungstate ($Li_2WO_4$), lithium niobium oxide ($LiNbO_3$), lithium phosphate ($Li_3PO_4$). lithium oxysulfide (LiAlSO, $Li_3PO_4$-$Li_2S$-$SiS_2$), lithium oxynitride (LiPON), etc.

A composite cathode layer, or more preferably a binder-free composite cathode layer may be composed of elemental sulfur, or sulfides, such as $Li_xS_y$, $MoS_2$, $FeS_2$, etc.

The elemental sulfur may be in powder form, encapsulated in various kinds of carbon products, such as graphite, fluorene cages, carbon tubes, etc. The sulfur can also be encapsuled in other form of microscopically engineered structures to control their release and stability.

An electronic conducting material may include, for example, graphene, reduced graphene oxide, carbon nanotubes, carbon black, Super P, acetylene black, carbon nanofibers, etc.

An ionic conducting material, or catholyte, may include or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

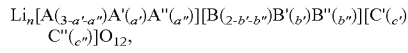

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv, wherein $0 \leq a' \leq 2$ and $0 \leq a" \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv, wherein $0 \leq b'$, $0 \leq b"$, and $b' + b" \leq 2$;

c. where C' and C" stand for a tetrahedral position of the crystal structure, i. where C' stands for one or more of Al, Ga, and boron, ii. where C" stands for one or more of Si and Ge, and iii, wherein $0 \leq c' \leq 0.5$ and $0 \leq c" \leq 0.4$; and d. wherein $n = 7 + a' + 2 \cdot a" - b' - 2 \cdot b" - 3 \cdot c' - 4 \cdot c"$ and $4.5 \leq n \leq 7.5$.

In another example, a solid-state ionic conductive material includes perovskite-type oxides such as (Li,La) $TiO_3$ or doped or replaced compounds.

In yet another example, a solid-state ionic conductive material includes NASICON-structured lithium membrane, such as LAGP ($Li_1$-$xAl_xGe_{2-x}(PO_4)_3$), LATP ($Li_1+xAl_x Ti_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x$; wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

In yet another example, a solid-state ionic conductive material includes argyrodites materials the general formula: $Li_{18-2m-x}(M_2^{m+}Y_7^{2-})Y_{2-x}^{2-}X_x$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

A composite cathode layer, or more preferably a binder-free composite cathode layer may be composed of active intercalation cathode/solid-state ionic conductive core/shell structures, wherein the solid-state ionic conductive material is in intimate contact, in the form of a shell around the active cathode particles. In such an instance, it is assumed that the active intercalation material is coated with a protective layer prior to the formation of the core/shell structure.

A composite cathode layer may further contain a binding polymer. An example of a binding polymer may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(e-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly(methyl styrene), poly(methylmethacrylate) (PMMA), poly(vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(e-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

A binding polymer may contain an ionic conducting salt. An example of an ionic conducting salt may include, for example, lithium bis(trifluoromethanesulfonyl)imide (LiTFSI) and lithium bis(fluorosulfonyl)imide (LiFSI), lithium bis(oxalato) borate (LiBOB), lithium Difluro(oxalato)borate (LiDFOB), LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LIN(SO$_2$CF$_3$)$_2$), LiNO$_3$, sodium bis(trifluoromethanesulfonyl)imide (NaTFSI) and sodium bis(fluorosulfonyl)imide (NaFSI), sodium bis(oxalato) borate (NaBOB) Sodium-difluoro (oxalato) borate (NaDFOB), NaSCN, NaBr, NaI, NaAsF$_6$, NaSO$_3$CF$_3$, NaSO$_3$CH$_3$, NaBF$_4$, NaPF$_6$, NaN(SO$_2$F)$_2$, NaClO$_4$, NaN(SO$_2$CF$_3$)$_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato) borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato) borate (KBOB), potassium Difluro(oxalato)borate (KDFOB), KSCN, KBr, KI, KClO$_4$, KASF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

The components of the composite cathode, or more preferably a binder-free composite cathode may be mixed together and sprayed.

Alternatively, the components of the composite cathode, or more preferably a binder-free composite cathode may be sprayed separately either simultaneously or alternatingly.

A composite cathode layer, or more preferably a binder-free composite cathode layer may be formed onto a solid-state electrolyte, or more preferably a binder-free solid-state electrolyte, layer.

A composite cathode layer, or more preferably a binder-free composite cathode layer may be formed onto a positive current collector.

A composite cathode layer, or more preferably a binder-free composite cathode layer may be formed onto a positive current collector layer A solid-state battery may have one composite cathode layer.

A solid-state battery may have more than one composite cathode layer in a multi-layered solid-state battery.

A binder-free solid-state battery may have one binder-free composite cathode layer.

A binder-free solid-state battery may have more than one binder-free composite cathode layer in a multi-layered solid-state battery.

A solid-state battery, or more preferably a binder-free solid-state battery may be a Li-air or lithium oxygen battery, the catalysis layers needed can also be deposited with an energy-assisted spray method or other non-energy-assisted spray methods.

The present description relates to a composite anode layer, or more preferably a binder-free composite anode layer.

A composite anode layer, or more preferably a binder-free composite anode layer may be composed of, for example, an active anode material, an electronic conducting material, and an ionic conducting material as the anolyte.

An active anode material in a composite anode layer, or more preferably a binder-free composite anode layer may include, for example, graphite, titanate, titanium oxide, silicon, tin oxide, lithium powder, germanium, antimony, silicon oxide, iron oxide, cobalt oxide, ruthenium oxide, molybdenum oxide, molybdenum sulfide, chromium oxide, nickel oxide, manganese oxide, carbon-based materials (hard carbons, soft carbons, graphene, graphite's, carbon nanofibers, carbon nanotubes, etc.).

An active anode material may be coated with a protective layer to prevent reaction between the active cathode material and the catholyte or other components in the mixture, which includes, lithium borate, lithium aluminate (LiAlO$_2$), lithium tungstate (Li$_2$WO$_4$), lithium niobium oxide (LiNbO$_3$), lithium phosphate (Li$_3$PO$_4$). lithium oxysulfide (LiAlSO, Li$_3$PO$_4$-Li$_2$S-SiS$_2$), lithium oxynitride (LiPON), etc.

An electronic conducting material may include, for example, graphene, reduced graphene oxide, carbon nanotubes, carbon black, Super P, acetylene black, carbon nanofibers, etc.

An ionic conducting material, or anolyte, may include or is formed from a solid-state ionic conductive material. A solid-state ionic conductive material can be described as a material that may have the following characteristics:

A solid-state ionic conductive material is a type of material that can selectively allow a specific charged element to pass through under a presence of an electric field or chemical potential, such as concentration differences.

While this solid-state ionic conductive material allows ions to migrate through, it may not allow electrons to pass easily.

The ions may carry 1, 2, 3, 4 or more positive charges. Examples of the charged ions include for example $H^+$, $Li^+$, $Na^+$, $K^+$, $Ag^+$, $Mg^{2+}$, $Zn^{2+}$, $Al^{3+}$, $Fe^{3+}$, etc.

The ionic conductivity of the corresponding ions is preferably to be $>10^{-7}$ S/cm. It is preferably to have lower electronic conductivity ($<10^{-7}$ S/cm).

Examples of the solid-state ionic conductive material include for example a garnet-like structure oxide material with the general formula:

$$Li_n[A_{(3-a'-a'')}A'_{(a')}A''_{(a'')}][B_{(2-b'-b'')}B'_{(b')}B''_{(b'')}][C'_{(c')}C''_{(c'')}]O_{12},$$

a. where A, A', and A" stand for a dodecahedral position of the crystal structure, i. where A stands for one or more trivalent rare earth elements, ii. where A' stands for one or more alkaline earth elements, iii. where A" stands for one or more alkaline metal elements other than Li, and iv, wherein $0 \leq a' \leq 2$ and $0 \leq a'' \leq 1$;

b. where B, B', and B" stand for an octahedral position of the crystal structure, i. where B stands for one or more tetravalent elements, ii. where B' stands for one or more pentavalent elements, iii. where B" stands for one or more hexavalent elements, and iv, wherein $0 \leq b'$, $0 \leq b''$, and $b'+b'' \leq 2$;

c. where C' and C" stand for a tetrahedral position of the crystal structure, i. where C' stands for one or more of Al, Ga, and boron, ii. where C" stands for one or more of Si and Ge, and iii, wherein $0 \leq c' \leq 0.5$ and $0 \leq c'' \leq 0.4$; and d. wherein $n=7+a'+2\cdot a''-b'-2\cdot b''-3\cdot c'-4\cdot c''$ and $4.5 \leq n \leq 7.5$.

In another example, a solid-state ionic conductive material includes perovskite-type oxides such as (Li,La)$TiO_3$ or doped or replaced compounds.

In yet another example, a solid-state ionic conductive material includes NASICON-structured lithium membrane, such as LAGP ($Li_{1-x}Al_xGe_{2-x}(PO_4)_3$), LATP ($Li_{1+x}Al_xTi_{2-x}(PO_4)_3$) and these materials with other elements doped therein.

In yet another example, a solid-state ionic conductive material includes anti-perovskite structure materials and their derivatives, such as the composition of $Li_3OCl$, $Li_3OBr$, $Li_3OI$.

In yet another example, a solid-state ionic conductive material includes $Li_3YH_6$(H=F, Cl, Br, I) family of materials, Y can be replaced by other rare earth elements.

In yet another example, a solid-state ionic conductive material includes $Li_{2x}S_{x+w+5z}M_yP_{2z}$, where x is 8-16, y is 0.1-6, w is 0.1-15, z is 0.1-3, and M is selected from the group consisting of lanthanides, Group 3, Group 4, Group 5, Group 6, Group 7, Group 8, Group 9, Group 12, Group 13, and Group 14 atoms, and combinations thereof.

In yet another example, a solid-state ionic conductive material includes argyrodites materials the general formula: $Li_{12-m-x}(M_mY_4^{2-})Y_{2-x}^{2-}X_x^-$; wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

In yet another example, a solid-state ionic conductive material includes argyrodites materials the general formula: $Li_{18-2m-x}(M_2^{m+}Y_7^{2-})Y_{2-x}^{2-}X_x^-$, wherein $M^{m+}=B^{3+}$, $Ga^{3+}$, $Sb^{3+}$, $Si^{4+}$, $Ge^{4+}$, $P^{5+}$, $As^{5+}$, or a combination thereof; $Y^{2-}=O^{2-}$, $S^{2-}$, $Se^{2-}$, $Te^{2-}$, or a combination thereof; $X^-=F^-$, $Cl^-$, $Br^-$, $I^-$, or a combination thereof; and x is in the range of $0 \leq x \leq 2$.

A composite anode layer, or more preferably a binder-free composite anode layer may be composed of active anode/solid-state ionic conductive core/shell structures, wherein the solid-state ionic conductive material is in intimate contact, in the form of a shell around the active anode particles. In such an instance, it is assumed that the active anode material is coated with a protective layer prior to the formation of the core/shell structure.

A composite anode layer may further contain a binding polymer. An example of a binding polymer may include, for example, polyethylene glycol, polyisobutene (e.g. OPPANOL™), polyvinylidene fluoride, polyvinyl alcohol. Additional examples of suitable polymer include, but are not limited to, polyolefins (e.g., polyethylenes, poly(butene-1), poly(n-pentene-2), polypropylene, polytetrafluoroethylene), polyamines (e.g., poly(ethylene imine) and polypropylene imine (PPI)); polyamides (e.g., polyamide (Nylon), poly(e-caprolactam) (Nylon 6), poly(hexamethylene adipamide) (Nylon 66)), polyimides (e.g., polyimide, polynitrile, and poly(pyromellitimide-1,4-diphenyl ether) (Kapton®) (NOMEX®) (KEVLAR®)); polyether ether ketone (PEEK); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly(vinyl alcohol), poly(vinyl chloride), poly(vinyl fluoride), poly(2-vinyl pyridine), vinyl polymer, polychlorotrifluoro ethylene, and poly(isohexylcynaoacrylate)); polyacetals; polyesters (e.g., polycarbonate, polybutylene terephthalate, polyhydroxybutyrate); polyethers (poly(ethylene oxide) (PEO), poly(propylene oxide) (PPO), poly(tetramethylene oxide) (PTMO)); vinylidene polymers (e.g., polyisobutylene, poly (methyl styrene), poly(methylmethacrylate) (PMMA), poly (vinylidene chloride), and poly(vinylidene fluoride)); polyaramides (e.g., poly(imino-1,3-phenylene iminoisophthaloyl) and poly(imino-1,4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). In some embodiments, the polymer may be selected from poly(n-pentene-2), polypropylene, polytetrafluoroethylene, polyamides (e.g., polyamide (Nylon), poly(e-caprolactam) (Nylon 6), poly(hexamethylene adipamide) (Nylon 66)), polyimides (e.g., polynitrile, and poly(pyromellitimide-1,4-diphenyl ether) (Kapton®) (NOMEX®) (KEVLAR®)), polyether ether ketone (PEEK).

A binding polymer may contain an ionic conducting salt. An example of an ionic conducting salt may include, for example, lithium bis(trifluoromethanesulfonyl)imide (LiTFSI) and lithium bis(fluorosulfonyl)imide (LiFSI), lithium bis(oxalato) borate (LiBOB), lithium Difluoro(oxalato)borate (LiDFOB), LiSCN, LiBr, LiI, $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LIN(SO_2CF_3)_2$, $LiNO_3$, sodium bis(trifluoromethanesulfonyl)imide (NaTFSI) and sodium bis(fluorosulfonyl)imide (NaFSI), sodium bis(oxalato) borate (NaBOB) Sodium-difluoro (oxalato) borate (NaDFOB), NaSCN, NaBr, NaI, $NaAsF_6$, $NaSO_3CF_3$, $NaSO_3CH_3$, $NaBF_4$, $NaPF_6$, $NaN(SO_2F)_2$, $NaClO_4$, $NaN(SO_2CF_3)_2$, NaNO$_3$, magnesium bis(trifluoromethanesulfonyl)imide (Mg(TFSI)$_2$) and magnesium bis(fluorosulfonyl)imide (Mg(FSI)$_2$), magnesium bis(oxalato) borate (Mg(BOB)$_2$), magnesium Difluro(oxalato)borate (Mg(DFOB)$_2$), Mg(SCN)$_2$, MgBr$_2$, MgI$_2$, Mg(ClO$_4$)$_2$, Mg(AsF$_6$)$_2$, Mg(SO$_3$CF$_3$)$_2$, Mg(SO$_3$CH$_3$)$_2$, Mg(BF$_4$)$_2$, Mg(PF$_6$)$_2$, Mg(NO$_3$)$_2$, Mg(CH$_3$COOH)$_2$, potassium bis(trifluoromethanesulfonyl)imide (KTFSI) and potassium bis(fluorosulfonyl)imide (KFSI), potassium bis(oxalato) borate (KBOB), potassium Difluro(oxalato)borate (KDFOB), KSCN, KBr, KI, KClO$_4$, KASF$_6$, KSO$_3$CF$_3$, KSO$_3$CH$_3$, KBF$_4$, KB(Ph)$_4$, KPF$_6$, KC(SO$_2$CF$_3$)$_3$, KN(SO$_2$CF$_3$)$_2$), KNO$_3$, Al(NO$_3$)$_2$, AlCl$_3$, Al$_2$(SO$_4$)$_3$, AlBr$_3$, AlI$_3$, AlN, AlSCN, Al(ClO$_4$)$_3$.

The components of the composite anode, or more preferably a binder-free composite anode may be mixed together and sprayed.

Alternatively, the components of the composite anode, or more preferably a binder-free composite anode may be sprayed separately either simultaneously or alternatingly.

A composite anode layer, or more preferably a binder-free composite anode layer may be formed onto a solid-state electrolyte layer, or more preferably a binder-free solid-state electrolyte layer.

A composite anode layer, or more preferably a binder-free composite anode layer may be formed onto a negative current collector.

A composite anode layer, or more preferably a binder-free composite anode layer may be formed onto a current collector layer.

A solid-state battery may have one composite anode layer.

A solid-state battery may have more than one composite anode layers.

A binder-free solid-state battery may have one binder-free composite anode layer.

A binder-free solid-state battery may have more than one binder-free composite anode layer in a multi-layered solid-state battery.

The present description relates to a current collector in a solid-state battery, or more preferably a binder-free solid-state battery.

A current collector may be considered the foundation of a solid-state battery, or more preferably a binder-free solid-state battery.

A current collector may be described as a negative current collector.

A negative current collecting material may include, for example, copper foil, stainless-steel foil, indium foil, lithium foil, lithium alloy foil, etc.

A lithium metal film may be prelaminated onto a negative current collector, in which a first solid-state electrolyte layer, or more preferably a binder-free solid-state electrolyte layer is formed upon.

A lithium metal film may be prelaminated onto both sides, or surfaces, of a negative current collector forming a double sided prelaminated anode, in which first solid-state electrolyte layers, or more preferably binder-free solid-state electrolyte layers are formed upon.

Alternatively, lithium powder may be sprayed onto the negative current collector to form a lithium metal layer, in which a first solid-state electrolyte layer, or more preferably a binder-free solid-state electrolyte layer is formed upon. The lithium metal alloy film may be formed onto both sides of the current collector. A lithium powder may have a protective coating for enhancing safety during the spray process. The lithium metal film may be cold rolled prior to the formation of the first solid-state electrolyte layer, or more preferably a binder-free solid-state electrolyte layer.

A lithium metal alloy film may be prelaminated onto a negative current collector, in which a first solid-state electrolyte layer, or more preferably a binder-free solid-state electrolyte layer is formed upon.

A lithium metal alloy film may be prelaminated onto both sides, or surface, of a negative current collector forming a double sided prelaminated anode, in which first solid-state electrolyte layers, or more preferably binder-free solid-state electrolyte layers are formed upon.

Alternatively, lithium powder and an alloying metal powder, such as indium powder, may be sprayed together onto the negative current collector to form a lithium metal alloy layer, in which a first solid-state electrolyte layer, or more preferably a binder-free solid-state electrolyte layer is formed upon. The lithium metal alloy film may be formed onto both sides of the current collector. Both lithium and alloy powders may have a protective coating for enhancing safety during the spray process. The lithium metal alloy film may be mixed prior to the formation of the first solid-state electrolyte layer, or more preferably a binder-free solid-state electrolyte layer. The lithium and the alloy metal powders may be sprayed from different spray guns simultaneously or alternatively.

A first composite anode layer, or more preferably a binder-free composite anode layer may be formed onto one side of the negative current collector using a spray processing method.

A first composite anode layer, or more preferably a binder-free composite anode layer may be formed onto both sides, or surfaces, of a negative current collector using a spray processing method to form a multi-layered structure.

A first solid-state electrolyte layer, or more preferably a binder-free solid-state electrolyte layer may be formed onto one side of the negative current collector using an energy-assisted spray processing method.

A first solid-state electrolyte layer, or more preferably a binder-free solid-state electrolyte layer may be formed onto both sides, or surfaces, of a negative current collector using an energy-assisted spray processing method to form a multi-layered anodeless structure.

A current collector may be described as a positive current collector.

A positive current collecting material may include, for example, aluminum foil, titanium foil, nickel foil, etc.

A first composite cathode layer, or more preferably a binder-free composite cathode layer may be formed onto one side of the positive current collector using an energy-assisted spray processing method.

A first composite cathode layer, or more preferably a binder-free composite cathode layer may be formed onto both sides, or surfaces, of a positive current collector using an energy-assisted spray processing method.

In addition, a solid-state battery, or more preferably a binder-free solid-state battery may have more than one current collector, in which an additional current collector layer may be applied as the final layer in the solid-state battery structure, typically in the form of a foil.

The present description relates to a current collector layer in a solid-state battery, or more preferably a binder-free solid-state battery.

A current collector layer may be defined as any additional electronically conducting layer that is formed within a solid-state battery, or more preferably within a binder-free solid-state battery and serves as a current collector.

A current collector layer may be formed using an energy-assisted spray processing method.

A current collector layer may be described as a negative current collector layer.

A negative current collector layer may be composed of, for example, copper metal, stainless-steel metal, indium metal, etc.

A negative current collector layer may be formed onto a composite anode layer, or more preferably binder-free composite anode layer.

A negative current collector layer may be formed onto a solid-state electrolyte layer, or more preferably a binder-free solid-state electrolyte layer.

A solid-state battery, or more preferably a binder-free solid-state battery may have one negative current collector layer.

A solid-state battery, or more preferably, a binder-free solid-state battery may have more than one negative current collector layer in a multi-layered solid-state battery.

A negative current collector layer may be the last or final layer in a solid-state battery, or more preferably a binder-free solid-state battery.

A current collector layer may be described as a positive current collector layer.

A positive current collector layer may be composed of, for example, aluminum metal, titanium metal, nickel metal, etc.

A positive current collector layer may be formed onto a composite cathode layer, or more preferably a binder-free composite cathode layer.

A solid-state battery, or more preferably a binder-free solid-state battery may have one positive current collector layer.

A solid-state battery, or more preferably a binder-free solid-state battery may have more than one positive current collector layer in a multi-layered solid-state battery.

A positive current collector layer may be the last or final layer in a solid-state battery, or more preferably a binder-free solid-state battery.

The present description relates to a solid-state battery structure.

A solid-state battery structure includes at least one current collector as the basis or foundation for the solid-state battery.

A solid-state battery structure is generally planar. Alternatively, a solid-state battery structure may be nonplanar.

The layers in a solid-state battery structure may have a thickness in the range of 1≤t≤1000 μm, with a preferred range of 10≤t≤100 μm.

Examples and a detailed description of solid-state battery structures are described below.

In an example, a negative current collector may be prelaminated with a lithium metal, or lithium metal alloy film forming a single sided prelaminated anode for a solid-state lithium metal battery.

In an aspect of the example, a lithium metal film may be prelaminated onto a negative current collector surface using a non-spray processing methods such as, for example, evaporation deposition. Alternatively, a lithium metal film may be formed onto a negative current collector using an energy-assisted spray process.

In another aspect of the example, a lithium metal alloy film may be prelaminated onto a negative current collector surface using a non-spray processing methods such as, for example, evaporation deposition. Alternatively, a lithium metal alloy film may be formed onto a negative current collector using an energy-assisted spray process. A metal alloy may include, for example, indium, tin, zinc, magnesium, etc.

In yet another aspect of the example, a first solid-state electrolyte layer may be formed onto the surface of the lithium metal, or lithium metal alloy, film.

In yet another aspect of the example, a first composite cathode layer may be formed onto the surface of the first solid-state electrolyte layer.

In yet another aspect of the example, a first positive current collector layer may be formed onto the surface of the first composite cathode layer.

In yet another aspect of the example, and for a multi-layered solid-state lithium metal battery, a second composite cathode layer may be formed onto the surface of the first positive current collector.

In yet another aspect of the example, and for a multi-layered solid-state lithium metal battery, a second solid-state electrolyte layer may be formed onto the surface of the second composite cathode layer.

In yet another aspect of the example, and for a multi-layered solid-state lithium metal battery, a second lithium metal, or lithium metal alloy, film may be formed onto the second solid-state electrolyte layer. In such an instance, a lithium metal, or lithium metal alloy, film may be deposited onto the surface of the second solid-state electrolyte layer using a non-spray processing method such as, for example, evaporation deposition. Alternatively, a lithium metal, or lithium metal alloy, film may be formed onto the surface of the second solid-state electrolyte layer using an energy-assisted spray process.

In yet another aspect of the example, and for a multi-layered solid-state lithium metal battery, a first negative current collector layer may be formed onto the second lithium metal, or lithium metal alloy, film layer.

Alternatively, a second lithium metal, or lithium metal alloy, film may be prelaminated onto a negative current collector, wherein a negative current collector is laminated onto the surface of the second solid-state electrolyte layer.

In yet another aspect of the example, a multi-layered solid-state lithium metal battery may include additional layers, wherein the description of the battery structure is self-evident.

In an example, a negative current collector may be prelaminated with a lithium metal, or lithium metal alloy, film on both sides, or surfaces, forming a double sided prelaminated anode for a multi-layered solid-state lithium metal battery.

In an aspect of the example, a lithium metal film may be prelaminated onto both sides, or surfaces, of a negative current collector using a non-spray processing methods such as, for example, evaporation deposition. Alternatively, a lithium metal film may be formed onto both sides, or surfaces, of a negative current collector using an energy-assisted spray process.

In another aspect of the example, a lithium metal alloy film may be prelaminated onto both sides, or surfaces, of a negative current collector using a non-spray processing methods such as, for example, evaporation deposition. Alternatively, a lithium metal alloy film may be formed onto both sides, or surfaces, of a negative current collector using an energy-assisted spray process. A metal alloy may include, for example, indium, tin, zinc, magnesium, etc.

In an aspect of the example, a first solid-state electrolyte layer may be formed onto the surface of both lithium metal, or lithium metal alloy, films.

In another aspect of the example, a first composite cathode layer may be formed onto the surface of both first solid-state electrolyte layers.

In yet another aspect of the example, a first positive current collector layer may be formed onto the surface of both first composite cathode layers.

In yet another aspect of the example, and for additional layers in a multi-layered solid-state lithium metal battery, a second composite cathode layer may be formed onto the surface of both first positive current collector layers.

In yet another aspect of the example, and for additional layers in a multi-layered solid-state lithium metal battery, a second solid-state electrolyte layer may be formed onto the surface of both second composite cathode layers.

In yet another aspect of the example, and for additional layers in a multi-layered solid-state lithium metal battery, a second lithium metal, or lithium metal alloy film may be formed onto the surface of both second solid-state electrolyte layers. In such an instance a lithium metal, or lithium metal alloy, film may be deposited onto the surface of both second solid-state electrolyte layers using a non-spray processing method such as, for example, evaporation deposition. Alternatively, a lithium metal, or lithium metal alloy, film may be formed onto the surface of both second solid-state electrolyte layers using an energy-assisted spray process.

In yet another aspect of the example, and for additional layers in a multi-layered solid-state lithium metal battery, a first negative current collector layer may be formed onto both second lithium metal, or lithium metal alloy, film layers.

Alternatively, a second lithium or lithium metal alloy film may be prelaminated onto a negative current collector, wherein a negative current collector is laminated onto the surface of both second solid-state electrolyte layers.

In yet another aspect of the example, a multi-layered solid-state lithium metal battery may include additional layers, wherein the description of the battery structure is self-evident.

In an example, a first solid-state electrolyte layer may be formed onto a negative current collector for an anodeless solid-state battery.

In an aspect of the example, a first composite cathode layer may be formed onto the surface of the first solid-state electrolyte layer.

In another aspect of the example, a first positive current collector layer may be formed onto the surface of the first composite cathode layer.

In yet another aspect of the example, and for a multi-layered anodeless solid-state battery, a second composite cathode layer may be formed onto the surface of the first positive current collector layer.

In yet another aspect of the example, and for a multi-layered anodeless solid-state battery, a second solid-state electrolyte layer may be formed onto the second composite cathode layer.

In yet another aspect of the example, and for a multi-layered anodeless solid-state battery, a first negative current collector layer may be formed onto the second solid-state electrolyte layer.

In yet another aspect of the example, a multi-layered anodeless solid-state battery may include additional layers, wherein the description of the battery structure is self-evident In an example, a first solid-state electrolyte layer may be formed onto both sides, or surfaces, of a negative current collector for a multi-layered anodeless solid-state battery.

In an aspect of the example, a first composite cathode layer may be formed onto the surface of both first solid-state electrolyte layers.

In another aspect of the example, a first positive current collector layer may be formed onto the surface of both first composite cathode layers.

In yet another aspect of the example, and for additional layers in a multi-layered anodeless solid-state battery structure, a second composite cathode layer may be formed onto the surface of both first positive current collector layers.

In yet another aspect of the example, and for additional layers in a multi-layered anodeless solid-state battery structure, a second solid-state electrolyte layer may be formed onto the surface of both second composite cathode layers.

In yet another aspect of the example, and for additional layers in a multi-layered anodeless solid-state battery structure, a first negative current collector layer may be formed onto the surface of both second solid-state electrolyte layers.

In yet another aspect, a multi-layered anodeless solid-state battery may include additional layers, wherein the description of the battery structure is self-evident.

In an example, a first composite anode layer may be formed onto a negative current collector for a solid-state battery.

In an aspect of the example, a first solid-state electrolyte layer may be formed onto the first composite anode layer.

In another aspect of the example, a first composite cathode layer may be formed onto the first solid-state electrolyte layer.

In yet another aspect of the example, a first positive current collector layer may be formed onto the first composite cathode layer.

In yet another aspect of the example, and for a multi-layered solid-state battery, a second composite cathode layer may be formed onto the surface of the first positive current collector layer.

In yet another aspect of the example, and for a multi-layered solid-state battery, a second solid-state electrolyte layer may be formed onto the surface of the second composite cathode layer.

In yet another aspect of the example, and for a multi-layered solid-state battery, a second composite anode layer may be formed onto the surface of the second solid-state electrolyte layer.

In yet another aspect of the example, and for a multi-layered solid-state battery, a first negative current collector layer may be formed onto the surface of a second composite anode layer.

In yet another aspect of the example, a multi-layered solid-state battery may include additional layers, wherein the description of the battery structure is self-evident.

In an example, a first composite anode layer may be formed onto both sides, or surfaces, of a negative current collector for multi-layered solid-state battery.

In an aspect of the example, a first solid-state electrolyte layer may be formed onto the surface of both first composite anode layers.

In another aspect of the example, a first composite cathode layer may be formed onto the surface of both first solid-state electrolyte layers.

In yet another aspect of the example, a first positive current collector layer may be formed onto the surface of both first composite cathode layers.

In yet another aspect of the example, and for additional layers in a multi-layered solid-state battery structure, a second composite cathode layer may be formed onto the surface of both first positive current collector layers.

In yet another aspect of the example, and for additional layers in a multi-layered solid-state battery structure, a second solid-state electrolyte layer may be formed onto the surface of both second composite cathode layers.

In yet another aspect of the example, and for additional layers in a multi-layered solid-state battery structure, a second composite anode layer may be formed onto the surface of both second solid-state electrolyte layers.

In yet another aspect of the example, and for additional layers in a multi-layered solid-state battery structure, a first negative current collector layer may be formed onto the surface of both second composite anode layers.

In yet another aspect of the example, a multi-layered solid-state battery may include additional layers, wherein the description of the battery structure is self-evident.

In an example, a first composite cathode layer may be formed onto a positive current collector for a solid-state battery.

In an aspect of the example, a first solid-state electrolyte layer may be formed onto the first composite cathode layer.

In another aspect of the example, a first composite anode layer may be formed onto the first solid-state electrolyte layer.

In yet another aspect of the example, a first negative current collector layer may be formed onto the first composite anode layer.

In yet another aspect of the example, and for a multi-layered solid-state battery, a second composite anode layer may be formed onto the surface of the first negative current collector layer.

In yet another aspect of the example, and for a multi-layered solid-state battery, a second solid-state electrolyte layer may be formed onto the surface of the second composite anode layer.

In yet another aspect of the example, and for a multi-layered solid-state battery, a second composite cathode layer may be formed onto the surface of the second solid-state electrolyte layer.

In yet another aspect of the example, and for a multi-layered solid-state battery, a first positive current collector layer may be formed onto the surface of the second composite cathode layer.

In yet another aspect of the example, a multi-layered solid-state battery may include additional layers, wherein the description of the battery structure is self-evident.

In an example, a first composite cathode layer may be formed onto both sides, or surfaces, of a positive current collector for a multi-layered solid-state battery.

In an aspect of the example, a first solid-state electrolyte layer may be formed onto the surface of both first composite cathode layers.

In yet another aspect of the example, a first composite anode layer may be formed onto the surface of both first solid-state electrolyte layers.

In yet another aspect of the example, a first negative current collector layer may be formed onto the surface of both first composite anode layers.

In yet another aspect of the example, and for additional layers in a multi-layered solid-state battery structure, a second composite anode layer may be formed onto the surface of both first negative current collector layers.

In yet another aspect of the example, and for additional layers in a multi-layered solid-state battery structure, a second solid-state electrolyte layer may be formed onto the surface of both second composite anode layers.

In yet another aspect of the example, and for additional layers in a multi-layered solid-state battery structure, a second composite cathode layer may be formed onto the surface of both second solid-state electrolyte layers.

In yet another aspect of the example, and for additional layers in a multi-layered solid-state battery structure, a first positive current collector layer may be formed onto the surface of both second composite cathode layers.

In yet another aspect of the example, a multi-layered solid-state battery may include additional layers, wherein the description of the battery structure is self-evident.

The present description relates to a binder-free solid-state battery structure.

A binder-free solid-state battery structure includes at least one current collector as the basis or foundation for the solid-state battery.

A binder-free solid-state battery structure is generally planar. Alternatively, a binder-free solid-state battery structure may be nonplanar.

The layers in a binder-free solid-state battery structure may have a thickness in the range of $1 \leq t \leq 1000$ μm, with a preferred range of $10 \leq t \leq 100$ μm.

Examples and a detailed description of binder-free solid-state battery structures are described below.

In an example, a negative current collector may be prelaminated with a lithium metal, or lithium metal alloy film forming a single sided prelaminated anode for a binder-free solid-state lithium metal battery.

In an aspect of the example, a lithium metal film may be prelaminated onto a negative current collector surface using a non-spray processing methods such as, for example, evaporation deposition. Alternatively, a lithium metal film may be formed onto a negative current collector using an energy-assisted spray process.

In another aspect of the example, a lithium metal alloy film may be prelaminated onto a negative current collector surface using a non-spray processing methods such as, for example, evaporation deposition. Alternatively, a lithium metal alloy film may be formed onto a negative current collector using an energy-assisted spray process. A metal alloy may include, for example, indium, tin, zinc, magnesium, etc.

In yet another aspect of the example, a first binder-free solid-state electrolyte layer may be formed onto the surface of the lithium metal, or lithium metal alloy, film.

In yet another aspect of the example, a first binder-free composite cathode layer may be formed onto the surface of the first binder-free solid-state electrolyte layer.

In yet another aspect of the example, a first positive current collector layer may be formed onto the surface of the first binder-free composite cathode layer.

In yet another aspect of the example, and for a multi-layered binder-free solid-state lithium metal battery, a second binder-free composite cathode layer may be formed onto the surface of the first positive current collector.

In yet another aspect of the example, and for a multi-layered binder-free solid-state lithium metal battery, a second binder-free solid-state electrolyte layer may be formed onto the surface of the second binder-free composite cathode layer.

In yet another aspect of the example, and for a multi-layered binder-free solid-state lithium metal battery, a second lithium metal, or lithium metal alloy, film may be formed onto the second binder-free solid-state electrolyte layer. In such an instance a lithium metal, or lithium metal alloy, film may be deposited onto the surface of the second binder-free solid-state electrolyte layer using a non-spray processing method such as, for example, evaporation deposition. Alternatively, a lithium metal, or lithium metal alloy, film may be formed onto the surface of the second binder-free solid-state electrolyte layer using an energy-assisted spray process.

In yet another aspect of the example, and for a multi-layered binder-free solid-state lithium metal battery, a first negative current collector layer may be formed onto the second binder-free lithium metal, or lithium metal alloy, film layer.

Alternatively, a second lithium metal, or lithium metal alloy, film may be prelaminated onto a negative current collector, wherein a negative current collector is laminated onto the surface of the second binder-free solid-state electrolyte layer.

In yet another aspect of the example, a multi-layered binder-free solid-state lithium metal battery may include additional layers, wherein the description of the battery structure is self-evident.

In an example, a negative current collector may be prelaminated with a lithium metal, or lithium metal alloy, film on both sides, or surfaces, forming a double sided prelaminated anode for a multi-layered binder-free solid-state lithium metal battery.

In an aspect of the example, a lithium metal film may be prelaminated onto both sides, or surfaces, of a negative current collector using a non-spray processing methods such as, for example, evaporation deposition. Alternatively, a lithium metal film may be formed onto both sides, or surfaces, of a negative current collector using energy-assisted spray process.

In another aspect of the example, a lithium metal alloy film may be prelaminated onto both sides, or surfaces, of a negative current collector using a non-spray processing methods such as, for example, evaporation deposition. Alternatively, a lithium metal alloy film may be formed onto both sides, or surfaces, of a negative current collector using an energy-assisted spray process. A metal alloy may include, for example, indium, tin, zinc, magnesium, etc.

In an aspect of the example, a first binder-free solid-state electrolyte layer may be formed onto the surface of both lithium metal, or lithium metal alloy, films.

In another aspect of the example, a first binder-free composite cathode layer may be formed onto the surface of both first binder-free solid-state electrolyte layers.

In yet another aspect of the example, a first positive current collector layer may be formed onto the surface of both first binder-free composite cathode layers.

In yet another aspect of the example, and for additional layers in a multi-layered binder-free solid-state lithium metal battery, a second binder-free composite cathode layer may be formed onto the surface of both first positive current collector layers.

In yet another aspect of the example, and for additional layers in a multi-layered binder-free solid-state lithium metal battery, a second binder-free solid-state electrolyte layer may be formed onto the surface of both second binder-free composite cathode layers.

In yet another aspect of the example, and for additional layers in a multi-layered binder-free solid-state lithium metal battery, a second lithium metal, or lithium metal alloy film may be formed onto the surface of both second binder-free solid-state electrolyte layers. In such an instance a lithium metal, or lithium metal alloy, film may be deposited onto the surface of both second binder-free solid-state electrolyte layers using a non-spray processing method such as, for example, evaporation deposition. Alternatively, a lithium metal, or lithium metal alloy, film may be formed onto the surface of both second binder-free solid-state electrolyte layers using an energy-assisted spray process.

In yet another aspect of the example, and for additional layers in the multi-layered binder-free solid-state lithium metal battery, a first negative current collector layer may be formed onto both second lithium metal, or lithium metal alloy, film layers.

Alternatively, a second lithium or lithium metal alloy film may be prelaminated onto a negative current collector, wherein a negative current collector is laminated onto the surface of both second binder-free solid-state electrolyte layers.

In yet another aspect of the example, a multi-layered binder-free solid-state lithium metal battery may include additional layers, wherein the description of the battery structure is self-evident.

In an example, a first binder-free solid-state electrolyte layer may be formed onto a negative current collector for an anodeless binder-free solid-state battery.

In an aspect of the example, a first binder-free composite cathode layer may be formed onto the surface of the first binder-free solid-state electrolyte layer.

In another aspect of the example, a first positive current collector layer may be formed onto the surface of the first binder-free composite cathode layer.

In yet another aspect of the example, and for a multi-layered binder-free anodeless solid-state battery, a second binder-free composite cathode layer may be formed onto the surface of the first positive current collector layer.

In yet another aspect of the example, and for a multi-layered binder-free anodeless solid-state battery, a second binder-free solid-state electrolyte layer may be formed onto the second binder-free composite cathode layer.

In yet another aspect of the example, and for a multi-layered binder-free anodeless solid-state battery, a first negative current collector layer may be formed onto the second binder-free solid-state electrolyte layer.

In yet another aspect of the example, a multi-layered binder-free anodeless solid-state battery may include additional layers, wherein the description of the battery structure is self-evident In an example, a first binder-free solid-state electrolyte layer may be formed onto both sides, or surfaces, of a negative current collector for a multi-layered binder-free anodeless solid-state battery.

In an aspect of the example, a first binder-free composite cathode layer may be formed onto the surface of both first binder-free solid-state electrolyte layers.

In another aspect of the example, a first positive current collector layer may be formed onto the surface of both first binder-free composite cathode layers.

In yet another aspect of the example, and for additional layers in a multi-layered binder-free anodeless solid-state battery structure, a second binder-free composite cathode layer may be formed onto the surface of both first positive current collector layers.

In yet another aspect of the example, and for additional layers in a multi-layered binder-free anodeless solid-state battery structure, a second binder-free solid-state electrolyte layer may be formed onto the surface of both second binder-free composite cathode layers.

In yet another aspect of the example, and for additional layers in a multi-layered binder-free anodeless solid-state battery structure, a first negative current collector layer may be formed onto the surface of both second binder-free solid-state electrolyte layers.

In yet another aspect, a multi-layered binder-free anode-less solid-state battery may include additional layers, wherein the description of the battery structure is self-evident.

In an example, a first binder-free composite anode layer may be formed onto a negative current collector for a binder-free solid-state battery.

In an aspect of the example, a first binder-free solid-state electrolyte layer may be formed onto the first binder-free composite anode layer.

In another aspect of the example, a first binder-free composite cathode layer may be formed onto the first binder-free solid-state electrolyte layer.

In yet another aspect of the example, a first positive current collector layer may be formed onto the first binder-free composite cathode layer.

In yet another aspect of the example, and for a multi-layered binder-free solid-state battery, a second binder-free composite cathode layer may be formed onto the surface of the first positive current collector layer.

In yet another aspect of the example, and for a multi-layered binder-free solid-state battery, a second binder-free solid-state electrolyte layer may be formed onto the surface of the second binder-free composite cathode layer.

In yet another aspect of the example, and for a multi-layered binder-free solid-state battery, a second binder-free composite anode layer may be formed onto the surface of the second binder-free solid-state electrolyte layer.

In yet another aspect of the example, and for a multi-layered binder-free solid-state battery, a first negative current collector layer may be formed onto the surface of a second binder-free composite anode layer.

In yet another aspect of the example, a multi-layered binder-free solid-state battery may include additional layers, wherein the description of the battery structure is self-evident.

In an example, a first binder-free composite anode layer may be formed onto both sides, or surfaces, of a negative current collector for a multi-layered binder-free solid-state battery.

In an aspect of the example, a first binder-free solid-state electrolyte layer may be formed onto the surface of both first binder-free composite anode layers.

In another aspect of the example, a first binder-free composite cathode layer may be formed onto the surface of both first binder-free solid-state electrolyte layers.

In yet another aspect of the example, a first positive current collector layer may be formed onto the surface of both first binder-free composite cathode layers.

In yet another aspect of the example, and for additional layers in a multi-layered binder-free solid-state battery structure, a second binder-free composite cathode layer may be formed onto the surface of both first positive current collector layers.

In yet another aspect of the example, and for additional layers in a multi-layered binder-free solid-state battery structure, a second binder-free solid-state electrolyte layer may be formed onto the surface of both second binder-free composite cathode layers.

In yet another aspect of the example, and for additional layers in a multi-layered binder-free solid-state battery structure, a second binder-free composite anode layer may be formed onto the surface of both second binder-free solid-state electrolyte layers.

In yet another aspect of the example, and for additional layers in a multi-layered binder-free solid-state battery structure, a first negative current collector layer may be formed onto the surface of both second binder-free composite anode layers.

In yet another aspect of the example, a multi-layered binder-free solid-state battery may include additional layers, wherein the description of the battery structure is self-evident.

In an example, a first binder-free composite cathode layer may be formed onto a positive current collector for a binder-free solid-state battery.

In an aspect of the example, a first binder-free solid-state electrolyte layer may be formed onto the first binder-free composite cathode layer.

In another aspect of the example, a first binder-free composite anode layer may be formed onto the first binder-free solid-state electrolyte layer.

In yet another aspect of the example, a first negative current collector layer may be formed onto the first binder-free composite anode layer.

In yet another aspect of the example, and for a multi-layered binder-free solid-state battery, a second binder-free composite anode layer may be formed onto the surface of the first negative current collector layer.

In yet another aspect of the example, and for a multi-layered binder-free solid-state battery, a second binder-free solid-state electrolyte layer may be formed onto the surface of the second binder-free composite anode layer.

In yet another aspect of the example, and for a multi-layered binder-free solid-state battery, a second binder-free composite cathode layer may be formed onto the surface of the second binder-free solid-state electrolyte layer.

In yet another aspect of the example, and for a multi-layered binder-free solid-state battery, a first positive current collector layer may be formed onto the surface of the second binder-free composite cathode layer.

In yet another aspect of the example, a multi-layered binder-free solid-state battery may include additional layers, wherein the description of the battery structure is self-evident.

In an example, a first binder-free composite cathode layer may be formed onto both sides, or surfaces, of a positive current collector for a multi-layered binder-free solid-state battery.

In an aspect of the example, a first binder-free solid-state electrolyte layer may be formed onto the surface of both first binder-free composite cathode layers.

In yet another aspect of the example, a first binder-free composite anode layer may be formed onto the surface of both first binder-free solid-state electrolyte layers.

In yet another aspect of the example, a first negative current collector layer may be formed onto the surface of both first binder-free composite anode layers.

In yet another aspect of the example, and for additional layers in a multi-layered binder-free solid-state battery structure, a second binder-free composite anode layer may be formed onto the surface of both first negative current collector layers.

In yet another aspect of the example, and for additional layers in a multi-layered binder-free solid-state battery structure, a second binder-free solid-state electrolyte layer may be formed onto the surface of both second binder-free composite anode layers.

In yet another aspect of the example, and for additional layers in a multi-layered binder-free solid-state battery structure, a second binder-free composite cathode layer may be formed onto the surface of both second binder-free solid-state electrolyte layers.

In yet another aspect of the example, and for additional layers in a multi-layered binder-free solid-state battery structure, a first positive current collector layer may be formed onto the surface of both second binder-free composite cathode layers.

In yet another aspect of the example, a multi-layered binder-free solid-state battery may include additional layers, wherein the description of the battery structure is self-evident.

The drawings of the present disclosure illustrates examples of a solid-state battery, or more preferably a binder-free solid-state battery.

FIG. 1A: A schematic illustration of a lithium metal or lithium metal alloy film (002) prelaminated onto a negative current collector (004).

Figure 1B:
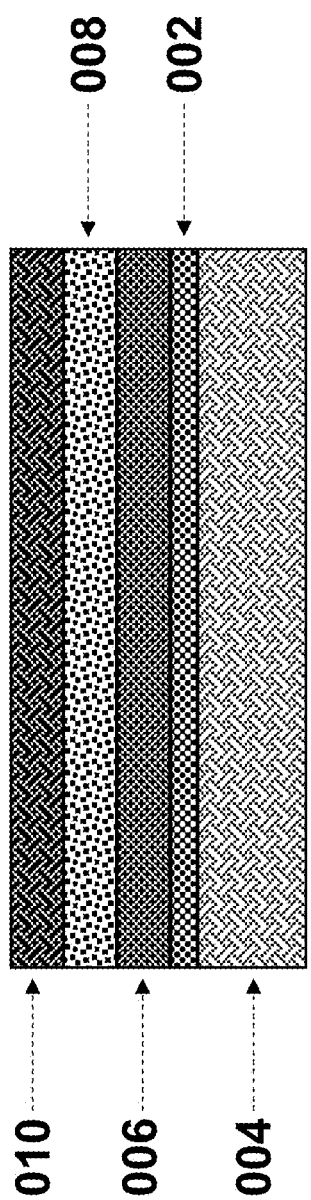
FIG. 1B: A schematic illustration of a solid-state lithium metal battery.

FIG. 1B: A schematic illustration of a solid-state lithium metal battery, preferably a binder-free lithium metal solid-state battery, wherein a first binder-free solid-state electrolyte layer (006) is sprayed onto a lithium metal or lithium metal alloy film (002) prelaminated onto a negative current collector (004). A first binder-free composite cathode layer (008) is formed on top of the first binder-free solid-state electrolyte layer (006). A first positive current collector layer (010) is formed onto the first binder-free composite cathode layer (008). An energy-assisted spray process for the binder-free solid-state battery is preferably cold spray.

Figure 1C:
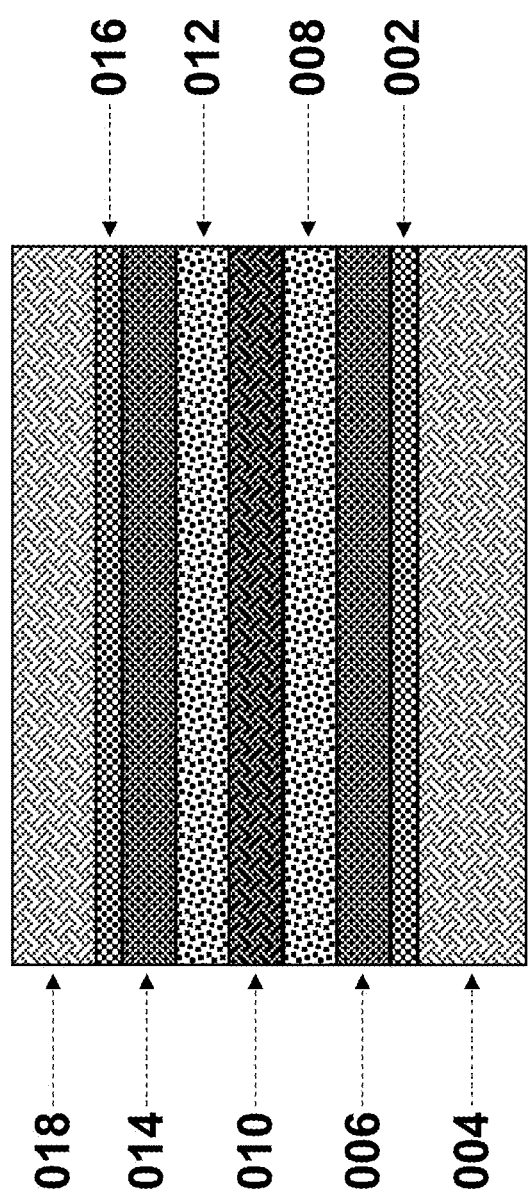
FIG. 1C: A schematic illustration of a multi-layer solid-state lithium metal battery.

FIG. 1C: A schematic illustration of a multi-layer solid-state lithium metal battery, preferably a multi-layer binder-free lithium metal solid-state battery, wherein a first binder-free solid-state electrolyte layer (006) is sprayed onto a lithium metal or lithium metal alloy film (002) prelaminated onto a negative current collector (004). A first binder-free composite cathode layer (008) is formed on top of the first binder-free solid-state electrolyte layer (006). A first positive current collector layer (010) is formed onto the first binder-free composite cathode layer (008). A second binder-free composite cathode layer (012) is formed onto the first positive current collector layer (010). A second binder-free solid-state electrolyte layer (014) is formed onto the second binder-free composite cathode layer (012). A second lithium metal or lithium metal alloy film (016) is formed on the second binder-free solid-state electrolyte layer (014). A first negative current collector layer (018) is formed onto the second lithium metal or lithium metal alloy film (016). An energy-assisted spray process for the multi-layer binder-free solid-state battery is preferably cold spray, for the exception of the second lithium metal or lithium metal alloy layer which may be formed using, for example, evaporation deposition.

Figure 2A:
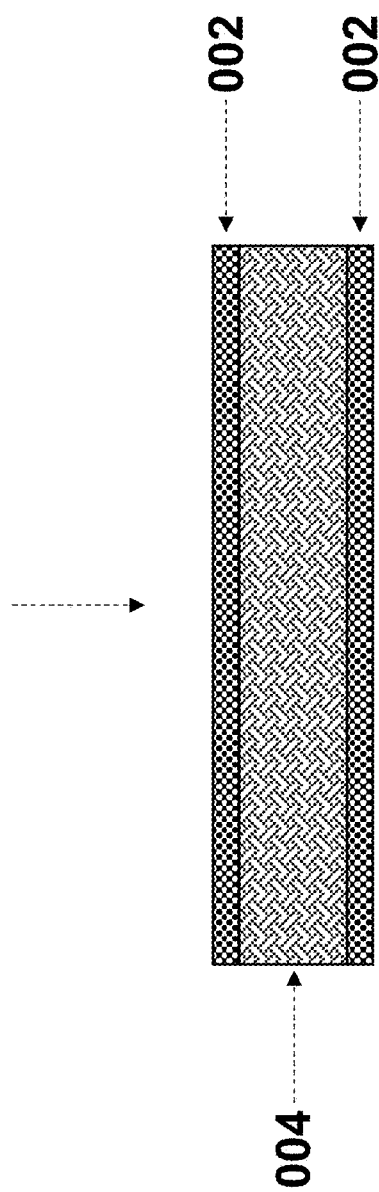
FIG. 2A: A schematic illustration of a lithium metal or lithium metal alloy film prelaminated onto both sides of a negative current collector to form a double sided prelaminated anode.

FIG. 2A: A schematic illustration of a lithium metal or lithium metal alloy film (002) prelaminated onto both sides of a negative current collector (004) to form a double sided prelaminated anode (020).

Figure 2B:
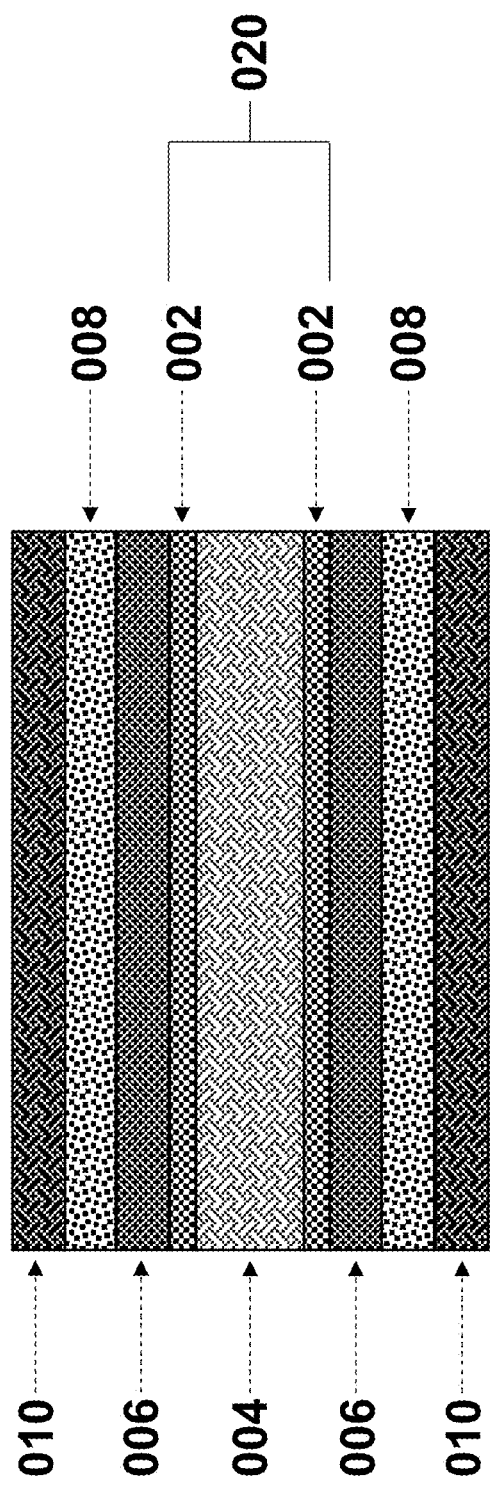
FIG. 2B: A schematic illustration of a multi-layer solid-state lithium metal battery.

FIG. 2B: A schematic illustration of a multi-layer solid-state lithium metal battery, preferably a multi-layer binder-free lithium metal solid-state battery, wherein a first binder-free solid-state electrolyte layer (006) is formed onto the lithium metal or lithium metal alloy films (002), prelaminated on the negative current collector (004), that make up a double sided prelaminated anode (020). A first binder-free composite cathode layer (008) is formed onto both first binder-free solid-state electrolyte layers (006). A first positive current collector layer (010) is formed onto both first binder-free composite cathode layers (008). An energy-assisted spray process for the multi-layer binder-free solid-state battery is preferably cold spray.

Figure 2C:
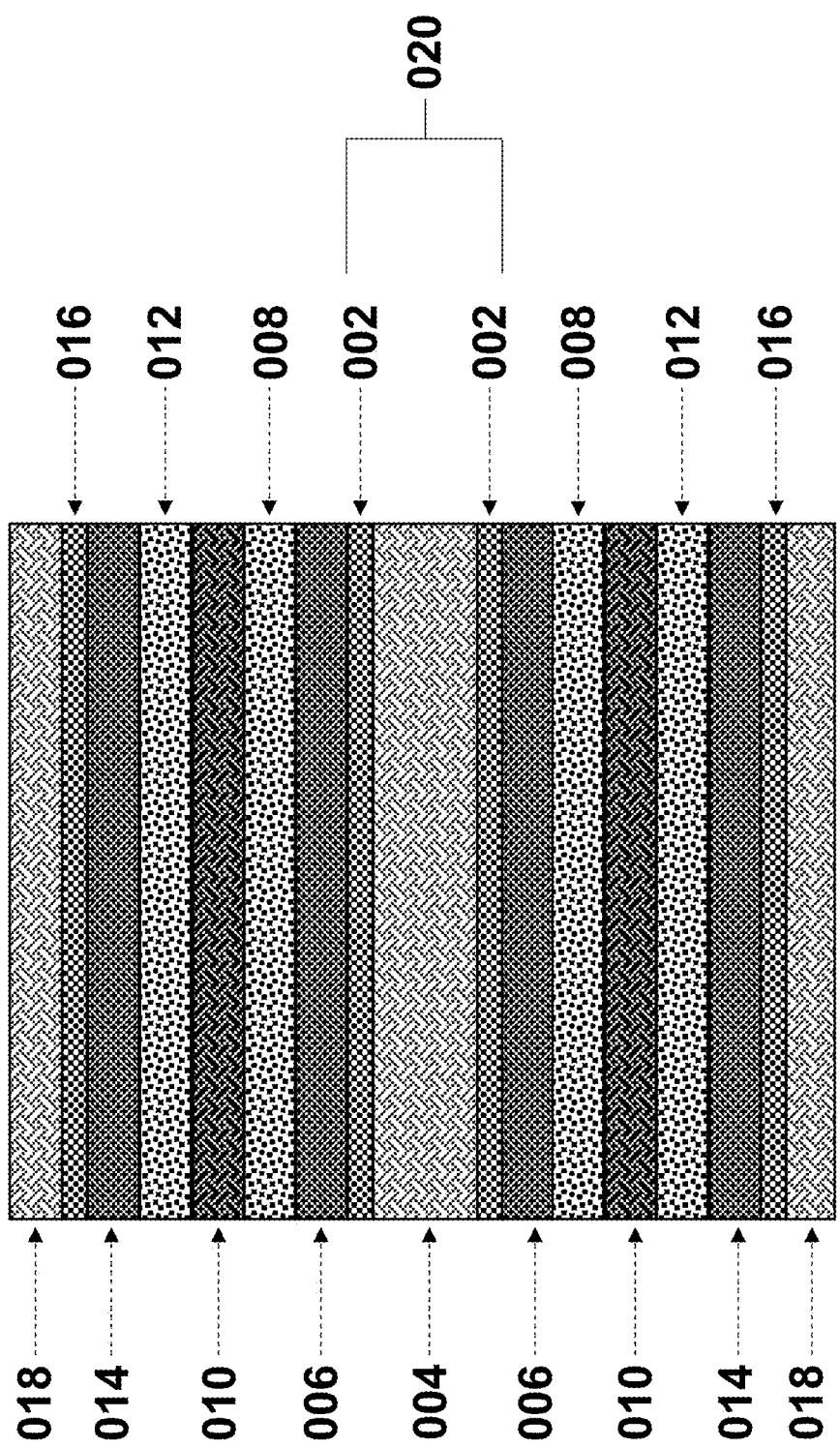
FIG. 2C: A schematic illustration of a multi-layer solid-state lithium metal battery.

FIG. 2C: A schematic illustration of a multi-layer solid-state lithium metal battery, preferably a multi-layer binder-free lithium metal solid-state battery, wherein a first binder-free solid-state electrolyte layer (006) is formed onto the lithium metal or lithium metal alloy films (002), prelaminated on the negative current collector (004), that make up a double sided prelaminated anode (020). A first binder-free composite cathode layer (008) is formed onto both first binder-free solid-state electrolyte layers (006). A first positive current collector layer (010) is formed onto both first binder-free composite cathode layers (008). A second binder-free composite cathode layer (012) is formed onto both first positive current collector layers (010). A second binder-free solid-state electrolyte layer (014) is formed onto both second binder-free composite cathode layers (012). A second lithium metal or lithium metal alloy film (016) is formed onto both second binder-free solid-state electrolyte layers (014). A first negative current collector layer (018) is formed onto both second lithium metal, or lithium metal alloy, films (016). An energy-assisted spray process for the multi-layer binder-free solid-state battery is preferably cold spray, for the exception of the second lithium metal, or lithium metal alloy, layer which may be formed using, for example, evaporation deposition.

Figure 3A:
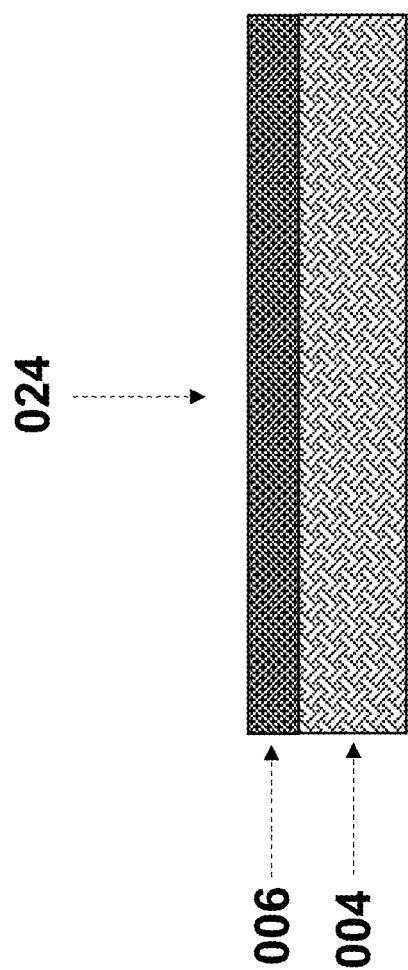
FIG. 3A: A schematic illustration of a first solid-state electrolyte layer formed directly onto the surface of a negative current collector, forming the basis for what is an anodeless binder-free solid-state battery.

FIG. 3A: A schematic illustration of a first solid-state electrolyte layer, preferably a binder-free solid-state electrolyte layer (006) formed directly onto the surface of a negative current collector (004), forming the basis for what is an anodeless binder-free solid-state battery (024).

Figure 3B:
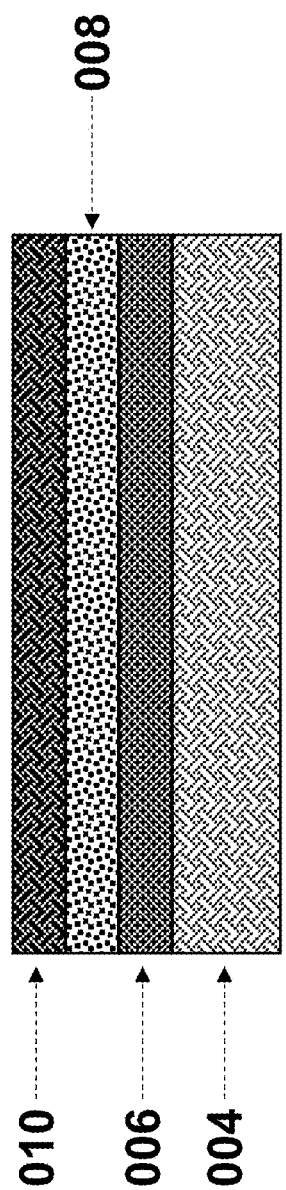
FIG. 3B: A schematic illustration of an anodeless solid-state battery.

FIG. 3B: A schematic illustration of an anodeless solid-state battery, preferably a binder-free anodeless solid-state battery, wherein a first binder-free solid-state electrolyte layer (006) is formed onto the surface of the negative current collector (004). A first binder-free composite cathode layer (008) is formed onto the surface of the binder-free solid-state electrolyte layer (006). A first positive current collector layer (010) is formed onto the surface of the first binder-free composite cathode layer (008).

Figure 3C:
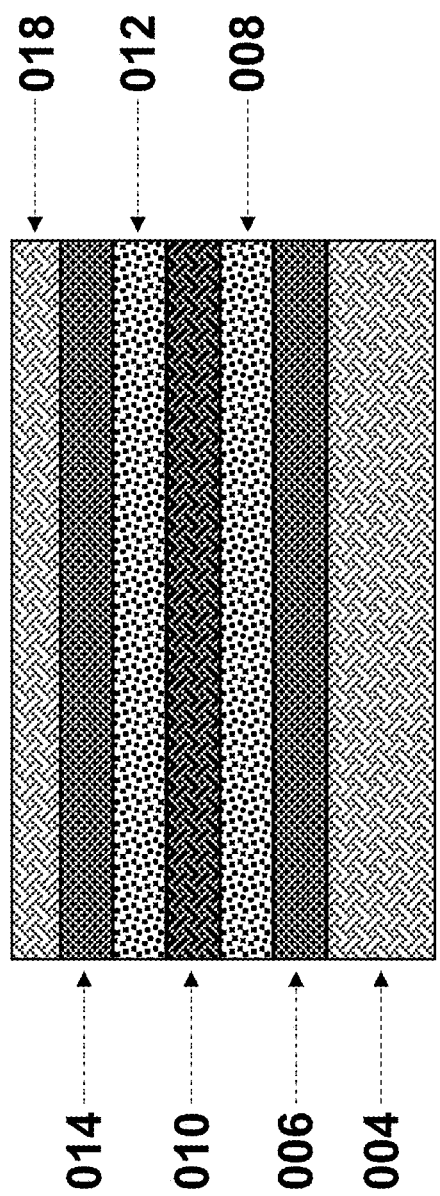
FIG. 3C: A schematic illustration of a multi-layer anodeless solid-state battery.

FIG. 3C: A schematic illustration of a multi-layer anodeless solid-state battery, preferably a multi-layer binder-free anodeless solid-state battery, wherein a first binder-free solid-state electrolyte layer (006) is formed onto the surface of the negative current collector (004). A first binder-free composite cathode layer (008) is formed onto the surface of the binder-free solid-state electrolyte layer (006). A first positive current collector layer (010) is formed onto the surface of the first binder-free composite cathode layer (008). A second binder-free composite cathode layer (012) is formed onto the first positive current collector layer (010). A second binder-free solid-state electrolyte layer (014) is formed onto the surface of the second binder-free composite cathode layer (012). A first negative current collector layer (018) is formed onto the surface of the second binder-free solid-state electrolyte layer.

Figure 3D:
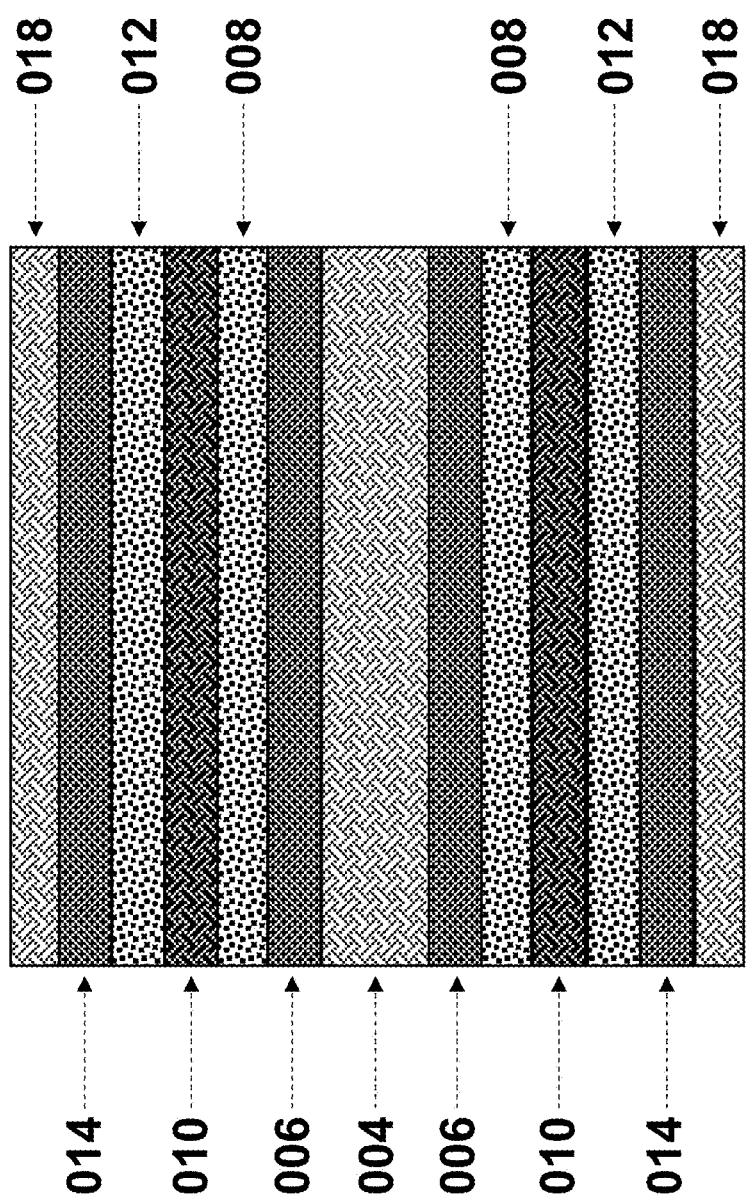
FIG. 3D: A schematic illustration of a multi-layer anodeless solid-state battery.

FIG. 3D: A schematic illustration of a multi-layer anodeless solid-state battery, preferably a multi-layer binder-free anodeless solid-state battery, wherein a first binder-free solid-state electrolyte layer (006) is formed onto both sides, or surface, of a negative current collector (004). A first binder-free composite cathode layer (008) is formed onto the surfaces of both binder-free solid-state electrolyte layers (006). A first positive current collector layer (010) is formed onto the surfaces of both first binder-free composite cathode layers (008). A second binder-free composite cathode layer (012) is formed onto the surfaces of both first positive current collector layers (010). A second binder-free solid-state electrolyte layer (014) is formed onto the surfaces of both second binder-free composite cathode layers (012). A first negative current collector layer (018) is formed onto the surfaces of both second binder-free solid-state electrolyte layers (014).

Figure 4A:
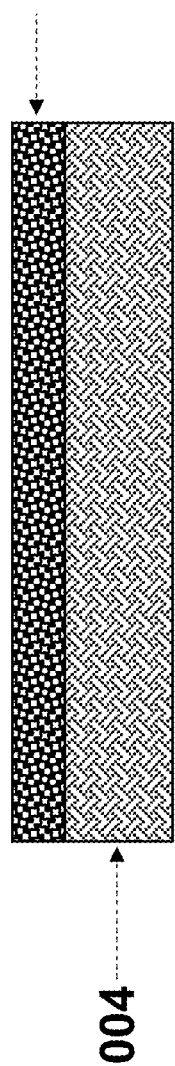
FIG. 4A: A schematic illustration of a first composite anode layer formed onto a negative current collector.

FIG. 4A: A schematic illustration of a first composite anode layer, preferably a first binder-free composite anode layer (026) formed onto a negative current collector (004).

Figure 4B:
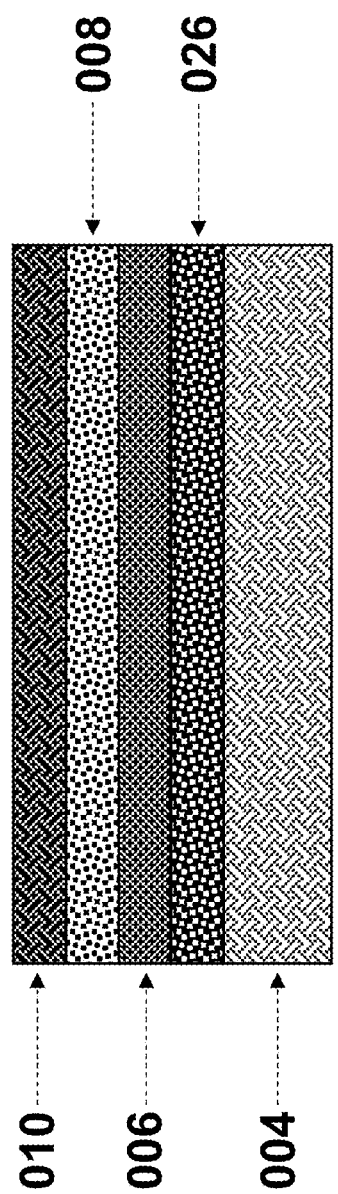
FIG. 4B: A schematic illustration of a solid-state battery.

FIG. 4B: A schematic illustration of a solid-state battery, preferably a binder-free solid-state battery, wherein a first binder-free composite anode layer (026) is formed onto the surface of a negative current collector (004). A first binder-free solid-state electrolyte layer (006) is formed onto the surface of a binder-free composite anode layer (026). A first binder-free composite cathode layer (008) is formed onto the surface of a first binder-free solid-state electrolyte layer (006). A first positive current collector layer (010) is formed onto the surface of a first binder-free composite cathode layer (008).

Figure 4C:
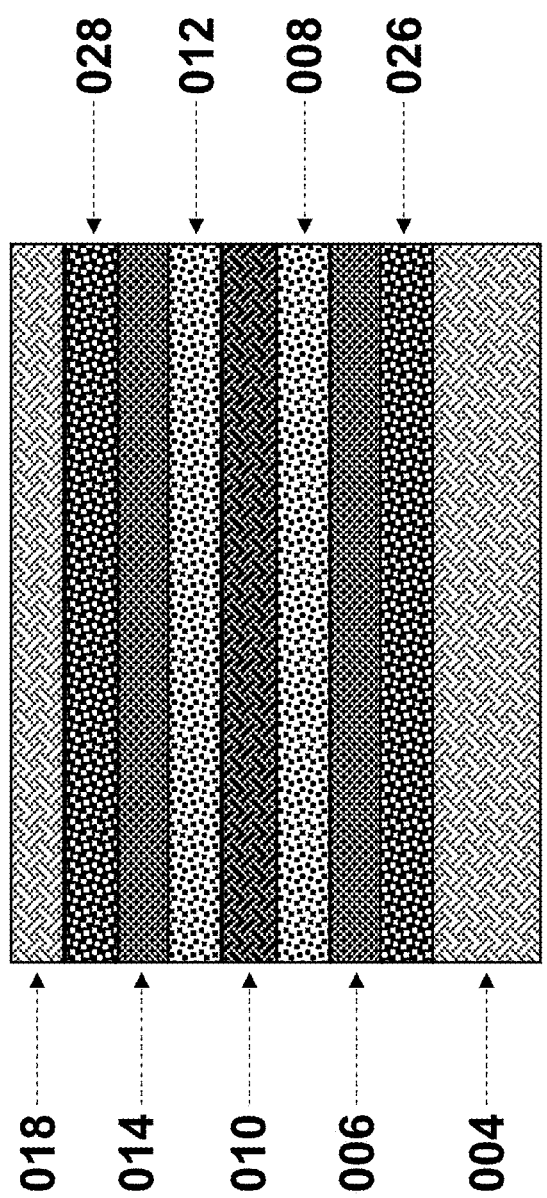
FIG. 4C: A schematic illustration of a multi-layer solid-state battery.

FIG. 4C: A schematic illustration of a multi-layer solid-state battery, preferably a multi-layer binder-free solid-state battery, wherein a first binder-free composite anode layer (026) is formed onto the surface of a negative current collector (004). A first binder-free solid-state electrolyte layer (006) is formed onto the surface of a first binder-free composite anode layer (026). A first binder-free composite cathode layer (008) is formed onto the surface of a first binder-free solid-state electrolyte layer (006). A first positive current collector layer (010) is formed onto the surface of a first binder-free composite cathode layer (008). A second binder-free composite cathode layer (012) is formed onto the surface of a first positive current collector layer (010). A second binder-free solid-state electrolyte layer (014) is formed onto the surface of a second binder-free composite cathode layer (012). A second binder-free composite anode layer (028) is formed onto the surface of a second binder-free solid-state electrolyte layer (014). A first negative current collector layer (018) is formed onto the surface of a second binder-free composite anode layer (028).

Figure 4D:
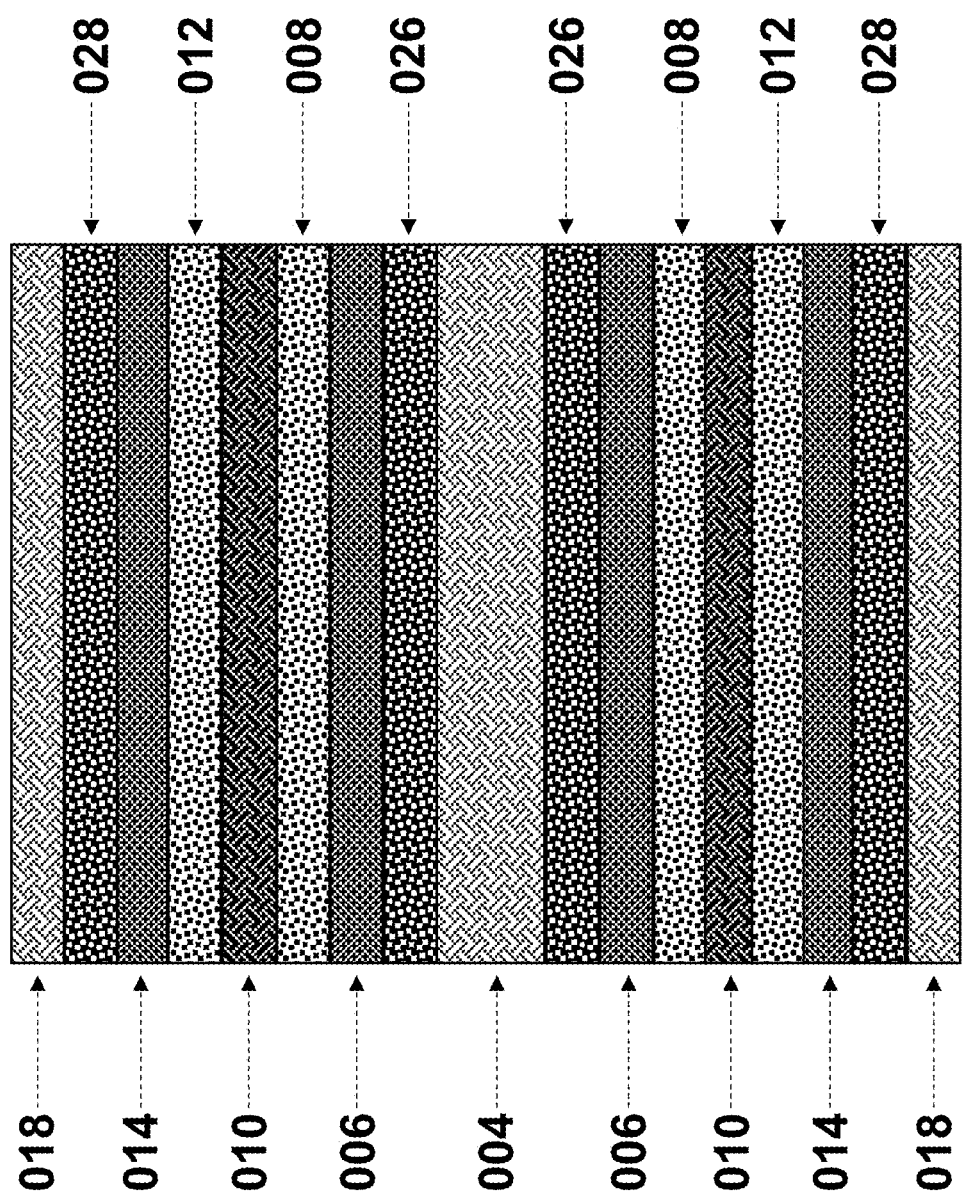
FIG. 4D: A schematic illustration of a multi-layer solid-state battery.

FIG. 4D: A schematic illustration of a multi-layer solid-state battery, preferably a multi-layer binder-free solid-state battery, wherein a first binder-free composite anode layer (026) is formed onto both sides, or surfaces, of a negative current collector (004). A first binder-free solid-state electrolyte layer (006) is formed onto the surfaces of both first binder-free composite anode layers (026). A first binder-free composite cathode layer (008) is formed onto the surfaces of both first binder-free solid-state electrolyte layers (006). A first positive current collector layer (010) is formed onto the surfaces of both first binder-free composite cathode layers (008). A second binder-free composite cathode layer (012) is formed onto the surfaces of both first positive current collector layers (010). A second binder-free solid-state electrolyte layer (014) is formed onto the surfaces of both second binder-free composite cathode layers (012). A second binder-free composite anode layer (028) is formed onto the surfaces of both second binder-free solid-state electrolyte layers (014). A first negative current collector layer (018) is formed onto the surfaces of both second binder-free composite anode layers (028).

Figure 5A:
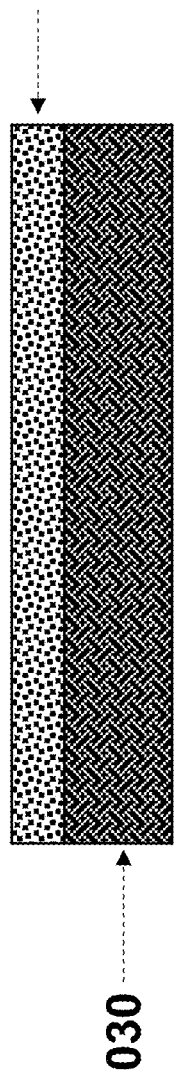
FIG. 5A: A schematic illustration of a first composite cathode layer formed onto a positive current collector.

FIG. 5A: A schematic illustration of a first composite cathode layer, preferably a first binder-free composite cathode layer (008) formed onto a positive current collector (030).

Figure 5B:
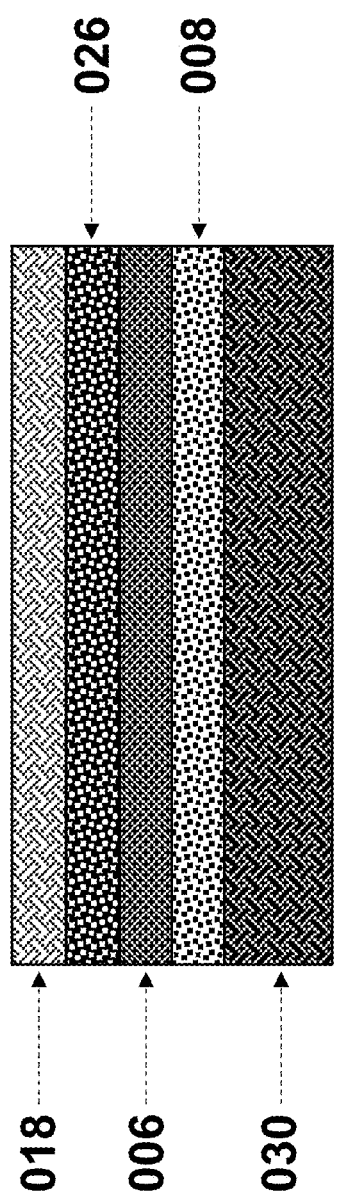
FIG. 5B: A schematic illustration of a solid-state battery.

FIG. 5B: A schematic illustration of a solid-state battery, preferably a binder-free solid-state battery, wherein a first binder-free composite cathode layer (008) is formed onto the surface of a positive current collector (030). A first binder-free solid-state electrolyte layer (006) is formed onto the surface of a first binder-free composite cathode layer (008). A first binder-free composite anode layer (026) is formed onto the surface of a first binder-free solid-state electrolyte layer (006). A first negative current collector layer (018) is formed onto the surface of a first binder-free composite anode layer (026).

Figure 5C:
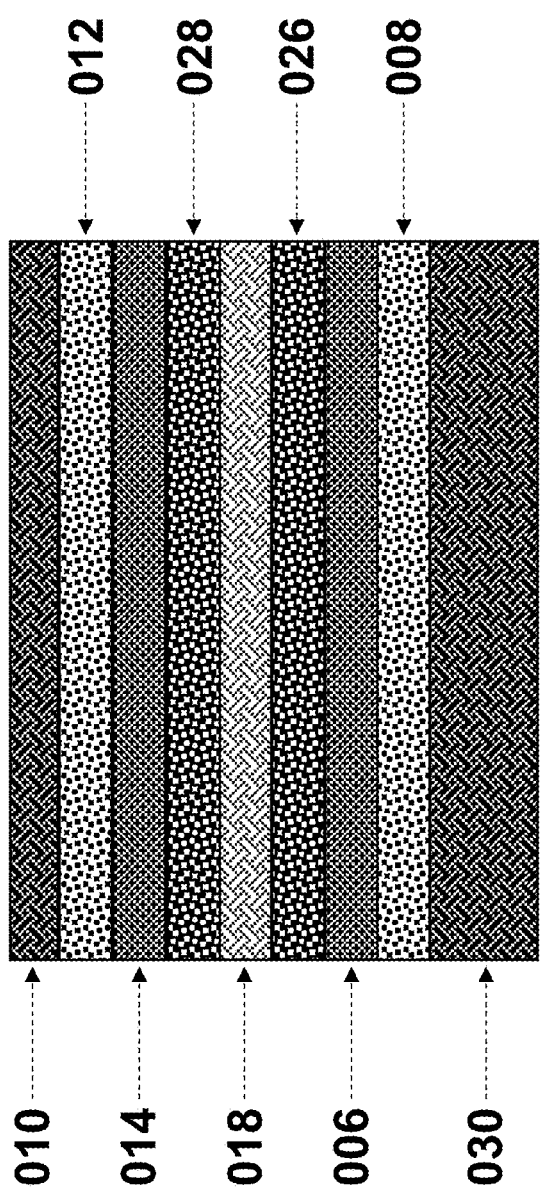
FIG. 5C: A schematic illustration of a multi-layer solid-state battery.

FIG. 5C: A schematic illustration of a multi-layer solid-state battery, preferably a multi-layer binder-free solid-state battery, wherein a first binder-free composite cathode layer (008) is formed onto the surface of a positive current collector (030). A first binder-free solid-state electrolyte layer (006) is formed onto the surface of a first binder-free composite cathode layer (008). A first binder-free composite anode layer (026) is formed onto the surface of a first binder-free solid-state electrolyte layer (006). A first negative current collector layer (018) is formed onto the surface of a first binder-free composite anode layer (026). A second binder-free composite anode layer (028) is formed onto the surface of a first negative current collector layer (018). A second binder-free solid-state electrolyte layer (014) is formed onto the surface of a second binder-free composite anode layer (028). A second binder-free composite cathode layer (012) is formed onto the surface of a second binder-free solid-state electrolyte layer (014). A first positive current collector layer (010) is formed onto the surface of a second binder-free composite cathode layer (012).

FIG. 5D: A schematic illustration of a multi-layer solid-state battery, preferably a multi-layer binder-free solid-state battery, wherein a first binder-free composite cathode layer (008) is formed onto both sides, or surfaces, of a positive current collector (030). A first binder-free solid-state electrolyte layer (006) is formed onto the surfaces of both first binder-free composite cathode layers (008). A first binder-free composite anode layer (026) is formed onto the surfaces of both first binder-free solid-state electrolyte layers (006). A first negative current collector layer (018) is formed onto the surfaces of both first binder-free composite anode layers (026). A second binder-free composite anode layer (028) is formed onto the surfaces of both first negative current collector layers (018). A second binder-free solid-state electrolyte layer (014) is formed onto the surfaces of both second binder-free composite anode layers (028). A second binder-free composite cathode layer (012) is formed onto the surfaces of both second binder-free solid-state electrolyte layers (014). A first positive current collector layer (010) is formed onto the surfaces of both second binder-free composite cathode layers (012).

With reference to the drawings, examples of a solid-state battery, preferably a binder-free solid-state battery may include one or more of the following.

Example 1: A solid-state lithium metal battery, preferably a binder-free solid-state lithium metal battery formed onto a prelaminated lithium metal anode.

In an aspect, a lithium metal, or lithium metal alloy, film may first be formed onto a stainless-steel current collector using, for example, evaporation deposition, forming a prelaminated anode. A schematic illustration of the example is shown in FIG. 1A.

In an aspect, a lithium metal alloy film may be composed of, for example, lithium and indium in what is termed a lithium-indium alloy film.

In an example, a cold spray process may be used to form a first binder-free solid-state electrolyte layer onto a lithium metal film, wherein the solid-state electrolyte material is an argyrodite structured ($Li_7PS_5Cl$) ionic conducting material. A first binder-free composite cathode layer is formed onto the argyrodite layer, wherein the composite cathode is composed of argyrodite as the catholyte and lithium nickel cobalt manganese oxide (NCM) as the active intercalation material. In this instance, an argyrodite/NCM mixture is sprayed together directly onto the argyrodite layer. A first positive current collector layer is formed onto the first composite cathode layer, wherein the collector layer is composed of aluminum metal. A schematic illustration of the example is shown in FIG. 1B.

In an aspect, the active intercalation material may be NCM622 coated with a thin layer of lithium borate in order to prevent side reactions with argyrodite.

In another aspect, the binder-free composite cathode may include an electronically conductive additive such as carbon black.

In an example, a cold spray process may be used to form a multi-layer binder-free solid-state lithium metal battery, wherein a first binder-free solid-state electrolyte layer (argyrodite) is formed onto a lithium metal film. A first binder-free composite cathode layer (argyrodite/NCM622) is formed onto the argyrodite layer. A first positive current collector layer, composed of aluminum metal, is formed onto the first composite cathode layer. A second binder-free composite cathode layer (argyrodite/NCM622) is formed onto the aluminum metal layer. A second binder-free solid-state electrolyte layer (argyrodite) is formed onto the second composite cathode layer. A second lithium metal film is formed onto the second argyrodite layer. A first current collector layer composed of stainless-steel is formed onto the second lithium metal layer. A schematic illustration of the example is shown in FIG. 1C.

In an aspect, the active intercalation material may be NCM622 coated with a thin layer of lithium borate in order to prevent side reactions with argyrodite.

In another aspect, the binder-free composite cathode may include an electronically conductive additive such as carbon black Example 2: A solid-state lithium metal battery, preferably a binder-free solid-state lithium metal battery formed onto a double sided prelaminated anode.

In an aspect, a lithium metal, or lithium metal alloy, film may first be formed onto both sides of a stainless-steel current collector using, for example, evaporation deposition, forming a double sided prelaminated anode. A schematic illustration of the example is shown in FIG. 2A.

In another aspect, a lithium metal alloy film may be composed of, for example, lithium and indium in what is termed a lithium-indium alloy film.

In an example, a cold spray process may be used to form a multi-layer binder free solid-state lithium metal battery, wherein a first binder-free solid-state electrolyte layer is formed onto the surface of both lithium metal films, wherein the solid-state electrolyte material is an Thio-LISCON LGPS ionic conducting material. A first binder-free composite cathode layer is formed onto the surface of both LGPS layers, wherein the composite cathode is composed of LGPS as the catholyte and lithium nickel cobalt manganese oxide (NCM) as the active intercalation material. In this instance, an LGPS/NCM mixture is sprayed together directly onto both LGPS layers. A first positive current collector layer is formed onto the first composite cathode layer, wherein the collector layer is composed of aluminum metal. A schematic illustration of the example is shown in FIG. 2B.

In an aspect, the active intercalation material may be NCM811 coated with a thin layer of lithium borate in order to prevent side reactions with LGPS.

In another aspect, the binder-free composite cathode may include an electronically conductive additive such as carbon black.

In an example, a cold spray process may be used to form a multi-layer binder free solid-state lithium metal battery, wherein a first binder-free solid-state electrolyte layer (LGPS) is formed onto both lithium metal films. A first binder-free composite cathode layer (LGPS/NCM) is formed onto the surface of both LGPS layers. A first positive current collector layer, composed of aluminum metal, is formed onto the surface of both first composite cathode layers. A second binder-free composite cathode layer (LGPS/NCM) is formed onto the surface of both aluminum metal layers. A second binder-free solid-state electrolyte layer (LGPS) is formed onto the surface both second composite cathode layers. A second lithium metal film is formed onto the surface of both LGPS layers. A first negative current collector is formed onto the surface of both lithium film layers. A schematic illustration of the example is shown in FIG. 2B.

In an aspect, the active intercalation material may be NCM811 coated with a thin layer of lithium borate in order to prevent side reactions with argyrodite.

In another aspect, the binder-free composite cathode may include an electronically conductive additive such as carbon black Example 3: An anodeless solid-state battery, preferably a binder-free anodeless solid-state battery.

In an aspect, a first binder-free solid-state electrolyte layer may be formed directly onto the surface of a negative current collector. A schematic illustration of the example is shown in FIG. 3A.

In an example, a plasma spray process may be used to form a first binder-free solid-state electrolyte layer onto a negative current collector, wherein the solid electrolyte is composed of garnet-structure lithium lanthanum zirconium oxide (LLZO), wherein copper metal foil is the negative current collector. A first binder-free composite cathode layer is formed onto the LLZO layer, wherein the composite cathode is composed of an LLZO catholyte and lithium nickel cobalt aluminum oxide (NCA) as the active intercalation material. In this instance the LLZO/NCA mixture is sprayed together directly onto the LLZO. A first positive current collector, composed of aluminum metal, is formed onto the surface of the first binder-free composite cathode layer. A schematic illustration of the example is shown in FIG. 3B.

In an aspect, the binder free composite cathode may include an electronically conductive additive such as carbon fibers.

In an example, a plasma spray process may be used to form a multi-layer binder-free anodeless solid-state battery, wherein a first binder-free solid-state electrolyte layer (LLZO) is formed onto the surface of a copper foil current collector. A first binder-free composite cathode layer, composed of an LLZO/NCA mixture, is formed onto the surface of the first LLZO layer. A first positive current collector, composed of aluminum metal, is formed onto the surface of the first binder-free composite cathode layer. A second binder-free composite cathode layer, composed of an LLZO/NCM mixture, is formed onto the surface of the aluminum metal layer. A second LLZO solid-state electrolyte layered is formed onto the surface of a second binder-free composite cathode layer. A first negative current collector layer is formed directly onto the surface of a second solid-state electrolyte layer. A schematic illustration of the example is shown in FIG. 3C.

In an example, a plasma spray process may be used to form a multi-layer binder-free anodeless solid-state battery, wherein a first binder-free solid-state electrolyte layer (LLZO) is formed onto both sides, or surfaces, of a copper foil current collector. A first binder-free composite cathode layer, composed of an LLZO/NCA mixture, is formed onto the surface of both first LLZO layers. A first positive current collector, composed of aluminum metal, is formed onto the surface of both first binder-free composite cathode layers. A second binder-free composite cathode layer, composed of an LLZO/NCM mixture, is formed onto the surface of both aluminum metal layers. A second LLZO solid-state electrolyte layered is formed onto the surface of both second binder-free composite cathode layers. A first negative current collector layer is formed directly onto the surface of both second solid-state electrolyte (LLZO) layers. A schematic illustration of the example is shown in FIG. 3D.

Example 4: A solid-state battery, preferably a binder-free solid-state battery formed using a cold-spray process.

In an aspect, a binder-free solid-state battery may be formed using a cold-spray process, wherein a first binder-free composite anode layer may be formed directly onto a negative current collector. A schematic illustration of the example is shown in FIG. 4A.

In an example, a cold spray process may be used to form a binder-free solid-state battery, wherein a first binder-free composite anode layer is formed directly onto a stainless-steel negative current collector. A first binder-free composite anode layer may be composed of a glass ceramic thiophosphate $Li_2S-P_2S_5$ (LPS) and graphite mixture, wherein the mixture is sprayed as a single solution directly onto the stainless-steel current collector. A first binder-free solid-state electrolyte layer, composed of LPS, is formed onto the surface of the composite anode layer. A first binder-free composite cathode layer is formed onto the LPS layer, wherein the composite cathode is composed of an LPS catholyte and lithium iron phosphate ($LiFePO_4$) as the active intercalation material. In this instance the LPS/$LiFePO_4$ mixture is sprayed together directly onto the LPS layer. A first positive current collector layer, composed of aluminum metal, is formed onto the composite cathode layer. A schematic illustration of the example is shown in FIG. 4B.

In an aspect, the active intercalation material ($LiFePO_4$) may be coated with a thin layer of lithium niobium oxide ($LiNbO_3$) in order to prevent side reactions with LPS.

In an aspect, the binder-free composite cathode may include an electronically conductive additive such as, for example, carbon black.

In an aspect, the binder-free composite anode may include an electronically conductive additive material such as, for example, carbon black.

In an example, a cold spray process may be used to form a multi-layer binder-free solid-state battery, wherein a first binder-free composite anode layer (LPS/Graphite) is formed directly onto a stainless-steel negative current collector surface. A first binder-free solid-state electrolyte layer (LPS) is formed onto the surface of the composite anode layer. A first binder-free composite cathode layer (LPS/$LiFePO_4$) is formed onto the surface of the LPS layer. A first positive current collector layer, composed of aluminum metal, is formed onto the surface of the composite cathode layer. A second binder-free composite cathode layer (LPS/$LiFePO_4$) is formed onto the surface of the first positive current collector layer. A second binder-free solid-state electrolyte layer (LPS) is formed onto the surface of the second composite cathode layer. A second binder-free composite anode layer (LPS/Graphite) is formed onto the surface of the second solid-state electrolyte layer. A first negative current collector layer, composed of copper, is formed onto the surface of the second composite anode layer. A schematic illustration of the example is shown in FIG. 4C.

In an aspect, the active intercalation material ($LiFePO_4$) may be coated with a thin layer of lithium niobium oxide ($LiNbO_3$) in order to prevent side reactions with LPS.

In an aspect, the binder-free composite cathode may include an electronically conductive additive such as, for example, carbon black.

In an aspect, the binder-free composite anode may include an electronically conductive additive material such as, for example, carbon black.

In an example, a cold spray process may be used to form a multi-layer binder-free solid-state battery, wherein a first binder-free composite anode layer (LPS/Graphite) is formed directly onto both sides, or surfaces, of a stainless-steel negative current collector. A first binder-free solid-state electrolyte layer (LPS) is formed onto the surface of both composite anode layers. A first binder-free composite cathode layer (LPS/$LiFePO_4$) is formed onto the surface of both LPS layers. A first positive current collector layer, composed of aluminum metal, is formed onto the surface of both composite cathode layers. A second binder-free composite cathode layer (LPS/$LiFePO_4$) is formed onto the surface of both first positive current collector layers. A second binder-free solid-state electrolyte layer (LPS) is formed onto the surface of both second composite cathode layers. A second binder-free composite anode layer (LPS/Graphite) is formed onto the surface of both second solid-state electrolyte layers. A first negative current collector layer, composed of copper, is formed onto the surface of both second composite anode layers. A schematic illustration of the example is shown in FIG. 4D.

In an aspect, the active intercalation material ($LiFePO_4$) may be coated with a thin layer of lithium niobium oxide ($LiNbO_3$) in order to prevent side reactions with LPS.

In an aspect, the binder-free composite cathode may include an electronically conductive additive such as, for example, carbon black.

In an aspect, the binder-free composite anode may include an electronically conductive additive material such as, for example, carbon black.

Example 5: A solid-state battery, preferably a binder-free solid-state battery formed using a thermal spray process.

In an aspect, a binder-free solid-state battery may be formed using a thermal spray process, wherein a first binder-free composite cathode layer may be formed directly onto a positive current collector. A schematic illustration of the example is shown in FIG. 5A.

In an example, a thermal spray process may be used to form a binder-free solid-state battery, wherein a first binder-free composite cathode layer is formed directly onto an aluminum positive current collector. A first binder-free composite cathode layer may be composed of NASICON-structured LAGP and lithium cobalt oxide ($LiCoO_2$), wherein the mixture is sprayed as a single solution directly onto the aluminum current collector. A first binder-free solid-state electrolyte layer, composed of LAGP, is formed onto the surface of the composite cathode layer. A first binder-free composite anode layer is formed onto the LAGP layer, wherein the composite anode is composed of LAGP as a catholyte and lithium titanate (LTO) as the active anode material. In this instance the LAGP/LTO mixture is sprayed together directly onto the LAGP layer. A first negative current collector layer, composed of copper metal, is formed onto the composite anode layer. A schematic illustration of the example is shown in FIG. 5B.

In an aspect, the binder-free composite cathode may include an electronically conductive additive such as, for example, Super P.

In an aspect, the binder-free composite anode may include an electronically conductive additive material such as, for example, Super P.

In an example, a thermal spray process may be used to form a multi-layer binder-free solid-state battery, wherein a first binder-free composite cathode layer (LAGP/LiCoO$_2$) is formed directly onto an aluminum current collector surface. A first binder-free solid-state electrolyte layer (LAGP) is formed onto the surface of the composite cathode layer. A first binder-free composite anode layer (LAGP/LTO) is formed onto the surface of the LAGP layer. A first negative current collector layer, composed of copper metal, is formed onto the surface of the composite anode layer. A second binder-free composite anode layer (LAGP/LTO) is formed onto the surface of the first negative current collector layer. A second binder-free solid-state electrolyte layer (LAGP) is formed onto the surface of the second composite anode layer. A second binder-free composite cathode layer (LAGP/LiCoO$_2$) is formed onto the surface of the second solid-state electrolyte layer. A first positive current collector layer, composed of aluminum metal, is formed onto the surface of the second composite cathode layer. A schematic illustration of the example is shown in FIG. 5C.

In an aspect, the binder-free composite cathode may include an electronically conductive additive such as, for example, Super P.

In an aspect, the binder-free composite anode may include an electronically conductive additive material such as, for example, Super P.

In an example, a thermal spray process may be used to form a multi-layer binder-free solid-state battery, wherein a first binder-free composite cathode layer (LAGP/LiCoO$_2$) is formed directly onto both sides, or surfaces, of an aluminum current collector. A first binder-free solid-state electrolyte layer (LAGP) is formed onto the surface of both composite cathode layers. A first binder-free composite anode layer (LAGP/LTO) is formed onto the surface of both LAGP layers. A first negative current collector layer, composed of copper metal, is formed onto the surface of both composite anode layers. A second binder-free composite anode layer (LAGP/LTO) is formed onto the surface of both first negative current collector layers. A second binder-free solid-state electrolyte layer (LAGP) is formed onto the surface of both second composite anode layers. A second binder-free composite cathode layer (LAGP/LiCoO$_2$) is formed onto the surface of both second solid-state electrolyte layers. A first positive current collector layer, composed of aluminum metal, is formed onto the surface of both second composite cathode layers. A schematic illustration of the example is shown in FIG. 5D.

In an aspect, the binder-free composite cathode may include an electronically conductive additive such as, for example, Super P.

In an aspect, the binder-free composite anode may include an electronically conductive additive material such as, for example, Super P.

In an aspect, a binder-free solid-state battery may be formed using a cold-spray process, wherein a first binder-free composite anode layer may be formed directly onto a negative current collector.

The above described systems and methods can be ascribed to secondary batteries with chemistries beyond lithium, which may include sodium ion, aluminum ion, magnesium ion, iron ion, potassium ion, etc.

The above described systems and methods can be ascribed to various secondary battery designs such as, for example, pouch cell, coil cell, button cell, cylindrical cell, prismatic cell, etc.

The above described systems and methods can be ascribed to secondary batteries with the end use applications such as, for example, to, electric vehicles, hybrid electric vehicles, mobile devices, handheld electronics, consumer electronics, medical, medical wearables, and wearables for portable energy storage.

The above described systems and methods can be ascribed to secondary batteries for grid scale energy storage backup systems.

The above described systems and methods can be ascribed to secondary batteries for longevity, higher energy density and power density and improved safety.

In the drawings, the following reference numbers are noted:
  002 Pre-laminated lithium metal or lithium metal alloy film
  004 Negative current collector
  006 First binder-free solid-state electrolyte layer
  008 First binder-free composite cathode layer
  010 First positive current collector layer
  012 Second binder-free composite cathode layer
  014 Second binder-free solid-state electrolyte layer
  016 First lithium metal or lithium metal alloy layer
  018 First negative current collector layer
  020 Double pre-laminated lithium metal or lithium metal alloy collector
  022 Second positive current collector layer
  024 Bare current collector for an anodeless battery
  026 First composite anode layer
  028 Second composite anode layer
  030 Positive current collector Although various embodiments of the disclosed solvent-free processing methods have been shown and described, modifications may occur to those skilled in the art upon reading the specification. The present application includes such modifications and is limited only by the scope of the claims.

What is claimed is:

1. A solvent-free, binder-free processing method for manufacturing a multi-layer solid-state battery, the method comprising:
  providing a foundational current collector as a foundation for the multi-layer solid-state battery;
  depositing a first solid-state electrolyte layer and a first cathode layer consisting of an active intercalation material, a conductive carbonaceous material, and a solid-state ionic conducting material by solvent-free, binder-free energy-assisted spraying on a first side of the foundational current collector;
  depositing a second solid-state electrolyte layer and a second cathode layer consisting of an active intercalation material, a conductive carbonaceous material, and a solid-state ionic conducting material by solvent-free, binder-free energy-assisted spraying on a second side of the foundational current collector;
  depositing a first deposited current collector by solvent-free, binder-free energy-assisted spraying or by non-spray deposition processing on the first solid-state electrolyte layer and the first cathode layer, wherein the first deposited current collector is deposited by solvent-free, binder-free energy-assisted spraying or by non-spray deposition processing directly on the first solid-state electrolyte layer or the first cathode layer; and depositing a second deposited current collector by solvent-free, binder-free energy-assisted spraying or by non-spray deposition processing on the second solid-state electrolyte layer and the second cathode layer, wherein the second deposited current collector is deposited by solvent-free, binder-free energy-assisted spraying or by non-spray deposition processing directly on the second solid-state electrolyte layer or the second cathode layer.

2. The solvent-free processing method of claim 1, wherein the first and second solid-state electrolyte layers include at least one of a garnet-like ionic conducting material, a perovskite-structured ionic conducting material, an anti-perovskite-structured ionic conducting material, a NASICON-structured ionic conducting material, an argyrodite-structured ionic conducting material, an $Li_3YH_6$ family ionic conducting material wherein Y is at least one rare earth element and wherein His at least one of F, Cl, Br, and I, and a $Li_{2x}S_{x+w+5z}M_yP_{2z}$ ionic conducting material wherein M is selected from the group consisting of lanthanides, Group 3, Group 4, Group 5, Group 6, Group 7, Group 8, Group 9, Group 12, Group 13, and Group 14 atoms, and combinations thereof.

3. The solvent-free processing method of claim 1, wherein the solid-state electrolyte material includes at least one of a garnet-like ionic conducting material, a perovskite-structured ionic conducting material, an anti-perovskite-structured ionic conducting material, a NASICON-structured ionic conducting material, an argyrodite-structured ionic conducting material, an $Li_3YH_6$ family ionic conducting material wherein Y is at least one rare earth element and wherein H is at least one of F, Cl, Br, and I, and a $Li_{2x}S_{x+w+5z}M_yP_{2z}$ ionic conducting material wherein M is selected from the group consisting of lanthanides, Group 3, Group 4, Group 5, Group 6, Group 7, Group 8, Group 9, Group 12, Group 13, and Group 14 atoms, and combinations thereof.

4. The solvent-free processing method of claim 1, wherein the active intercalation material includes at least one of a layered oxide, a spinel oxide, an olivine phosphate, a silicate, borate, a tavorite material, vanadium oxide, sulfur, lithium sulfide, $FeF_3$, and LiSe.

5. The solvent-free processing method of claim 1, wherein the active intercalation material is coated with a protective layer.

6. The solvent-free processing method of claim 5, wherein the protective layer includes at least one a lithium metal oxide, a lithium metal phosphate, a lithium metal borate, a lithium metal, lithium oxysulfide, and lithium oxynitride.

7. The solvent-free processing method of claim 1, wherein the conductive carbonaceous material includes at least one of graphene, reduced graphene oxide, carbon nanotubes, carbon black, Super P, acetylene black, and carbon nanofibers.

8. The solvent-free processing method of claim 1, wherein the first and second cathode layers include core-shell structures, wherein the core comprises the active intercalation material and the shell comprises the solid-state electrolyte material.

9. The solvent-free processing method of claim 8, wherein active intercalation material cores are coated with a protective layer prior to the formation of the core-shell structures.

10. The solvent-free processing method of claim 9, wherein the protective layer includes at least one a lithium metal oxide, a lithium metal phosphate, a lithium metal borate, a lithium metal, lithium oxysulfide, and lithium oxynitride.

11. The solvent-free processing method of claim 1, further comprising:
depositing a first composite anode layer by solvent-free, binder-free energy-assisted spraying on the first side of the foundational current collector; and
depositing a second composite anode layer by solvent-free, binder-free energy-assisted spraying on the second side of the foundational current collector.

12. The solvent-free processing method of claim 1, wherein the foundational current collector is a positive current collector, wherein the first cathode layer is deposited on the first side of the foundational current collector, wherein the first solid-state electrolyte layer is deposited on the first cathode layer, wherein the second cathode layer is deposited on the second side of the foundational current collector, and wherein the second solid-state electrolyte layer is deposited on the second cathode layer.

13. The solvent-free processing method of claim 12, further comprising:
depositing a first composite anode layer by solvent-free, binder-free energy-assisted spraying on the first solid-state electrolyte layer; and
depositing a second composite anode layer by solvent-free, binder-free energy-assisted spraying on the second solid-state electrolyte layer.

14. The solvent-free processing method of claim 12, wherein the first deposited current collector is deposited directly on the first solid-state electrolyte layer, and wherein the second deposited current collector is deposited directly on the second solid-state electrolyte layer.

15. The solvent-free processing method of claim 1, wherein the foundational current collector is a negative current collector, wherein the first solid-state electrolyte layer is deposited on the first side of the foundational current collector, wherein the first cathode layer is deposited on the first solid-state electrolyte layer, wherein the second solid-state electrolyte layer is deposited on the second side of the foundational current collector, and wherein the second cathode layer is deposited on the second solid-state electrolyte layer.

16. The solvent-free processing method of claim 15, further comprising:
depositing a first composite anode layer by solvent-free, binder-free energy-assisted spraying on the first side of the foundational current collector; and
depositing a second composite anode layer by solvent-free, binder-free energy-assisted spraying on the second side of the foundational current collector,
wherein the first solid-state electrolyte layer is deposited on the first composite anode layer, and wherein the second solid-state electrolyte layer is deposited on the second composite anode layer.

17. The solvent-free processing method of claim 15, further comprising:
depositing a first composite anode layer by solvent-free, binder-free energy-assisted spraying directly on the first side of the foundational current collector; and
depositing a second composite anode layer by solvent-free, binder-free energy-assisted spraying directly on the second side of the foundational current collector.

18. The solvent-free processing method of claim 15, wherein a first lithium metal or lithium metal alloy layer is prelaminated on the first side of the foundational current collector, and wherein a second lithium metal or lithium metal alloy layer is prelaminated on the second side of the foundational current collector.

19. The solvent-free processing method of claim 1, wherein the first solid-state electrolyte layer is in intimate contact with the first cathode layer, and wherein the second solid-state electrolyte layer is in intimate contact with the second cathode layer.

20. A solvent-free, binder-free processing method for manufacturing a multi-layer solid-state battery, the method comprising:
  providing a foundational current collector as a foundation for the multi-layer solid-state battery;
  depositing a first solid-state electrolyte layer and a first cathode layer by solvent-free, binder-free energy-assisted spraying on a first side of the foundational current collector, wherein the first cathode layer is metal-free;
  depositing a second solid-state electrolyte layer and a second cathode layer by solvent-free, binder-free energy-assisted spraying on a second side of the foundational current collector, wherein the second cathode layer is metal-free;
  depositing a first deposited current collector by solvent-free, binder-free energy-assisted spraying or by non-spray deposition processing on the first solid-state electrolyte layer and the first cathode layer, wherein the first deposited current collector is deposited by solvent-free, binder-free energy-assisted spraying or by non-spray deposition processing directly on the first solid-state electrolyte layer or the first cathode layer; and
  depositing a second deposited current collector by solvent-free, binder-free energy-assisted spraying or by non-spray deposition processing on the second solid-state electrolyte layer and the second cathode layer, wherein the second deposited current collector is deposited by solvent-free, binder-free energy-assisted spraying or by non-spray deposition processing directly on the second solid-state electrolyte layer or the second cathode layer.

21. The solvent-free processing method of claim 20, wherein the first and second solid-state electrolyte layers and first and second cathode layers are deposited by cold spraying.

22. The solvent-free processing method of claim 20, wherein the first and second solid-state electrolyte layers and first and second cathode layers are deposited by thermal spraying.

23. The solvent-free processing method of claim 20, wherein the first and second deposited current collectors are deposited by solvent-free, binder-free energy-assisted spraying or evaporation deposition.

* * * * *